US010684043B2

(12) United States Patent
Okano et al.

(10) Patent No.: US 10,684,043 B2
(45) Date of Patent: Jun. 16, 2020

(54) AIR-CONDITIONING APPARATUS

(71) Applicant: Mitsubishi Electric Corporation, Tokyo (JP)

(72) Inventors: Hiroyuki Okano, Tokyo (JP); Naofumi Takenaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 31 days.

(21) Appl. No.: 15/780,411

(22) PCT Filed: Feb. 8, 2016

(86) PCT No.: PCT/JP2016/053613
§ 371 (c)(1),
(2) Date: May 31, 2018

(87) PCT Pub. No.: WO2017/138059
PCT Pub. Date: Aug. 17, 2017

(65) Prior Publication Data
US 2018/0347868 A1 Dec. 6, 2018

(51) Int. Cl.
*F25B 13/00* (2006.01)
*F24F 11/64* (2018.01)
(Continued)

(52) U.S. Cl.
CPC ............. *F25B 13/00* (2013.01); *F24F 11/64* (2018.01); *F24F 11/70* (2018.01); *F24F 11/84* (2018.01);
(Continued)

(58) Field of Classification Search
CPC .......... F25B 13/00; F25B 41/062; F25B 5/02; F25B 1/00; F25B 2313/0252;
(Continued)

(56) References Cited

U.S. PATENT DOCUMENTS

2006/0254294 A1* 11/2006 Shimamoto ............. F24F 3/065
62/238.7
2012/0318011 A1* 12/2012 Ochiai .................. F25B 49/005
62/127
(Continued)

FOREIGN PATENT DOCUMENTS

JP  05-172434 A   7/1993
JP  H06-257828 A  9/1994
(Continued)

OTHER PUBLICATIONS

Office Action dated May 28, 2019 issued in corresponding JP patent application No. 2017-566245 (and English translation).
(Continued)

*Primary Examiner* — Kun Kai Ma
(74) *Attorney, Agent, or Firm* — Posz Law Group, PLC

(57) ABSTRACT

An air-conditioning apparatus includes a heat source unit, a plurality of indoor units, and a relay unit. The heat source unit includes a heat-source-side flow control valve connected to a heat-source-side heat exchanger, a bypass pipe connected in parallel to the heat-source-side heat exchanger, a bypass flow control valve provided in the bypass pipe, and a gas-liquid separating unit configured to, when refrigerant flows out to the high-pressure pipe, mix refrigerant in a liquid state flowing through the heat-source-side heat exchanger and refrigerant in a gas state flowing through the bypass pipe and cause mixed refrigerant to flow out to the high-pressure pipe, and configured to, when refrigerant flows in from the low-pressure pipe, separate the refrigerant flowing in from the low-pressure pipe into refrigerant in a liquid state flowing into the heat-source-side heat exchanger and refrigerant in a gas state flowing into the bypass pipe.

11 Claims, 9 Drawing Sheets

(51) Int. Cl.
  *F24F 11/84* (2018.01)
  *F24F 11/70* (2018.01)
  *F24F 11/89* (2018.01)
  *F25B 1/00* (2006.01)
  *F25B 5/02* (2006.01)
  *F25B 9/00* (2006.01)
  *F25B 41/06* (2006.01)
  *F24F 140/50* (2018.01)

(52) U.S. Cl.
  CPC ............... *F24F 11/89* (2018.01); *F25B 1/00* (2013.01); *F25B 5/02* (2013.01); *F25B 9/008* (2013.01); *F25B 41/062* (2013.01); *F24F 2140/50* (2018.01); *F25B 2313/0231* (2013.01); *F25B 2313/0233* (2013.01); *F25B 2313/0252* (2013.01); *F25B 2313/0272* (2013.01); *F25B 2313/0294* (2013.01); *F25B 2313/0311* (2013.01); *F25B 2313/0314* (2013.01); *F25B 2400/23* (2013.01); *F25B 2600/2501* (2013.01); *F25B 2600/2509* (2013.01); *F25B 2600/2513* (2013.01); *F25B 2700/1931* (2013.01); *F25B 2700/1933* (2013.01)

(58) Field of Classification Search
  CPC ...... F25B 2600/2513; F25B 2600/2501; F25B 2313/0231; F25B 2313/0311; F25B 2313/0314; F25B 2313/0233; F25B 2313/0294
  See application file for complete search history.

(56) References Cited

U.S. PATENT DOCUMENTS

| | | | |
|---|---|---|---|
| 2013/0283843 A1* | 10/2013 | Takenaka | F25B 9/006 62/324.6 |
| 2014/0026603 A1* | 1/2014 | Toya | F24F 1/0003 62/129 |
| 2014/0096551 A1* | 4/2014 | Morimoto | F25B 9/006 62/129 |
| 2014/0260392 A1* | 9/2014 | Hawkins | F25B 29/003 62/238.6 |
| 2014/0360218 A1* | 12/2014 | Takenaka | F25B 13/00 62/324.6 |
| 2015/0211776 A1* | 7/2015 | Koge | F25B 13/00 62/160 |
| 2015/0300676 A1* | 10/2015 | Motomura | F25B 13/00 62/186 |
| 2015/0316284 A1* | 11/2015 | Tanaka | F25B 13/00 62/196.1 |
| 2015/0338120 A1* | 11/2015 | Azuma | F25B 13/00 62/196.1 |
| 2016/0245540 A1* | 8/2016 | Koge | F25B 43/00 |
| 2016/0320100 A1* | 11/2016 | Okano | F25B 13/00 |
| 2017/0097177 A1* | 4/2017 | Azuma | F24F 11/89 |
| 2017/0198945 A1* | 7/2017 | Azuma | F24F 11/89 |

FOREIGN PATENT DOCUMENTS

| | | |
|---|---|---|
| JP | H07-294050 A | 11/1995 |
| JP | 2014-129976 A | 7/2014 |
| WO | 2013/111176 A1 | 8/2013 |
| WO | 2015/097787 A1 | 7/2015 |
| WO | 2015/140994 A1 | 9/2015 |

OTHER PUBLICATIONS

International Search Report of the International Searching Authority dated Apr. 26, 2016 for the corresponding international application No. PCT/JP2016/053613 (and English translation).

* cited by examiner

AIR-CONDITIONING APPARATUS

CROSS REFERENCE TO RELATED APPLICATION

This application is a U.S. national stage application of PCT/JP2016/053613 filed on Feb. 8, 2016, the contents of which are incorporated herein by reference.

TECHNICAL FIELD

The present invention relates to an air-conditioning apparatus including a relay unit that distributes refrigerant supplied from a heat source unit to a plurality of indoor units.

BACKGROUND ART

A conventional air-conditioning apparatus that uses a refrigeration cycle, such as a heat pump cycle, includes a refrigerant circuit through which refrigerant flows. In the refrigerant circuit, a heat source unit including a compressor and a heat-source-side heat exchanger is connected by pipes to an indoor unit including an expansion valve and a load-side heat exchanger. The air-conditioning apparatus performs air conditioning while changing the pressure, temperature, and other factor of refrigerant flowing through the refrigerant circuit by removing heat from or transferring heat to air in an air-conditioned space, which is a target of heat exchange, when the refrigerant evaporates or condenses in the load-side heat exchanger. Also suggested is an air-conditioning apparatus including a heat source unit, a plurality of indoor units, and a relay unit that distributes refrigerant supplied from the heat source unit to the plurality of indoor units. In such an air-conditioning apparatus, a simultaneous cooling and heating operation is performed in which necessity of a cooling operation or a heating operation is automatically determined for each of the plurality of indoor units depending on a temperature set by a remote control or other related component supplied with to the indoor unit, an ambient temperature of the indoor unit, and other temperatures, and a cooling operation or a heating operation is performed in each indoor unit.

As an air-conditioning apparatus that performs a simultaneous cooling and heating operation, Patent Literature 1 discloses an air-conditioning apparatus including a heat source unit in which a heat-source-side heat exchanger and a fourth flow control device are connected in series to each other and the heat-source-side heat exchanger and a switching valve are connected in parallel to each other. The air-conditioning apparatus disclosed in Patent Literature 1 further includes a gas-liquid separator that connects a point between the heat-source-side heat exchanger and the fourth flow control device, an accumulator, and a high-pressure pipe to each other, and a fifth flow control device disposed between the gas-liquid separator and the accumulator. According to Patent Literature 1, in the case of a cooling main operation in which the heat-source-side heat exchanger acts as a condenser, the condensation ability of the heat-source-side heat exchanger is controlled by controlling the fourth flow control device and the switching valve depending on a ratio of a cooling operation capacity to a heating operation capacity of the plurality of indoor units. In addition, according to Patent Literature 1, in the case of a heating main operation in which the heat-source-side heat exchanger acts as an evaporator, the evaporation ability of the heat-source-side heat exchanger is controlled by controlling the fifth flow control device depending on a ratio of a cooling operation capacity to a heating operation capacity of the plurality of indoor units.

CITATION LIST

Patent Literature

Patent Literature 1: International Publication No. WO/2015/097787

SUMMARY OF INVENTION

Technical Problem

However, in the air-conditioning apparatus disclosed in Patent Literature 1, different flow control valves are necessary for individual operation modes to adjust the heat exchange ability of the heat-source-side heat exchanger. Thus, the number of components increases and the cost increases accordingly.

The present invention has been made to solve the above-described problem and provides an air-conditioning apparatus including a reduced number of components.

Solution to Problem

An air-conditioning apparatus of an embodiment of the present invention includes a heat source unit including a compressor, a flow switching valve, and a heat-source-side heat exchanger, a plurality of indoor units, each including a load-side flow control valve and a load-side heat exchanger and performing a cooling operation or a heating operation, and a relay unit connected to the heat source unit by a low-pressure pipe and a high-pressure pipe, connected to the plurality of indoor units by a plurality of gas branch pipes and a plurality of liquid branch pipes, and configured to distribute refrigerant supplied from the heat source unit to the plurality of indoor units. The heat source unit includes a heat-source-side flow control valve connected to the heat-source-side heat exchanger and configured to control a flow rate of refrigerant flowing through the heat-source-side heat exchanger, a bypass pipe connected in parallel to the heat-source-side heat exchanger, a bypass flow control valve provided in the bypass pipe and configured to control a flow rate of refrigerant flowing through the bypass pipe, and a gas-liquid separating unit connected to the heat-source-side heat exchanger, the bypass pipe, the high-pressure pipe, and the low-pressure pipe, configured to, when refrigerant flows out to the high-pressure pipe, mix refrigerant in a liquid state flowing through the heat-source-side heat exchanger and refrigerant in a gas state flowing through the bypass pipe and cause mixed refrigerant to flow out to the high-pressure pipe, and configured to, when refrigerant flows in from the low-pressure pipe, separate the refrigerant flowing in from the low-pressure pipe into refrigerant in a liquid state flowing into the heat-source-side heat exchanger and refrigerant in a gas state flowing into the bypass pipe.

Advantageous Effects of Invention

According to an embodiment of the present invention, when refrigerant flows out to the high-pressure pipe, the gas-liquid separating unit mixes refrigerant in a liquid state flowing through the heat-source-side heat exchanger and refrigerant in a gas state flowing through the bypass pipe and causes mixed refrigerant to flow out to the high-pressure pipe, and when refrigerant flows in from the low-pressure pipe, the gas-liquid separating unit separates the refrigerant flowing in from the low-pressure pipe into refrigerant in a liquid state flowing into the heat-source-side heat exchanger and refrigerant in a gas state flowing into the bypass pipe. Consequently, to control the heat exchange ability of the heat-source-side heat exchanger, the opening degree of the bypass flow control valve may be controlled in any operation mode. Thus, the number of components can be reduced and the cost can be reduced accordingly.

DESCRIPTION OF EMBODIMENTS

Embodiment 1

Figure 1:
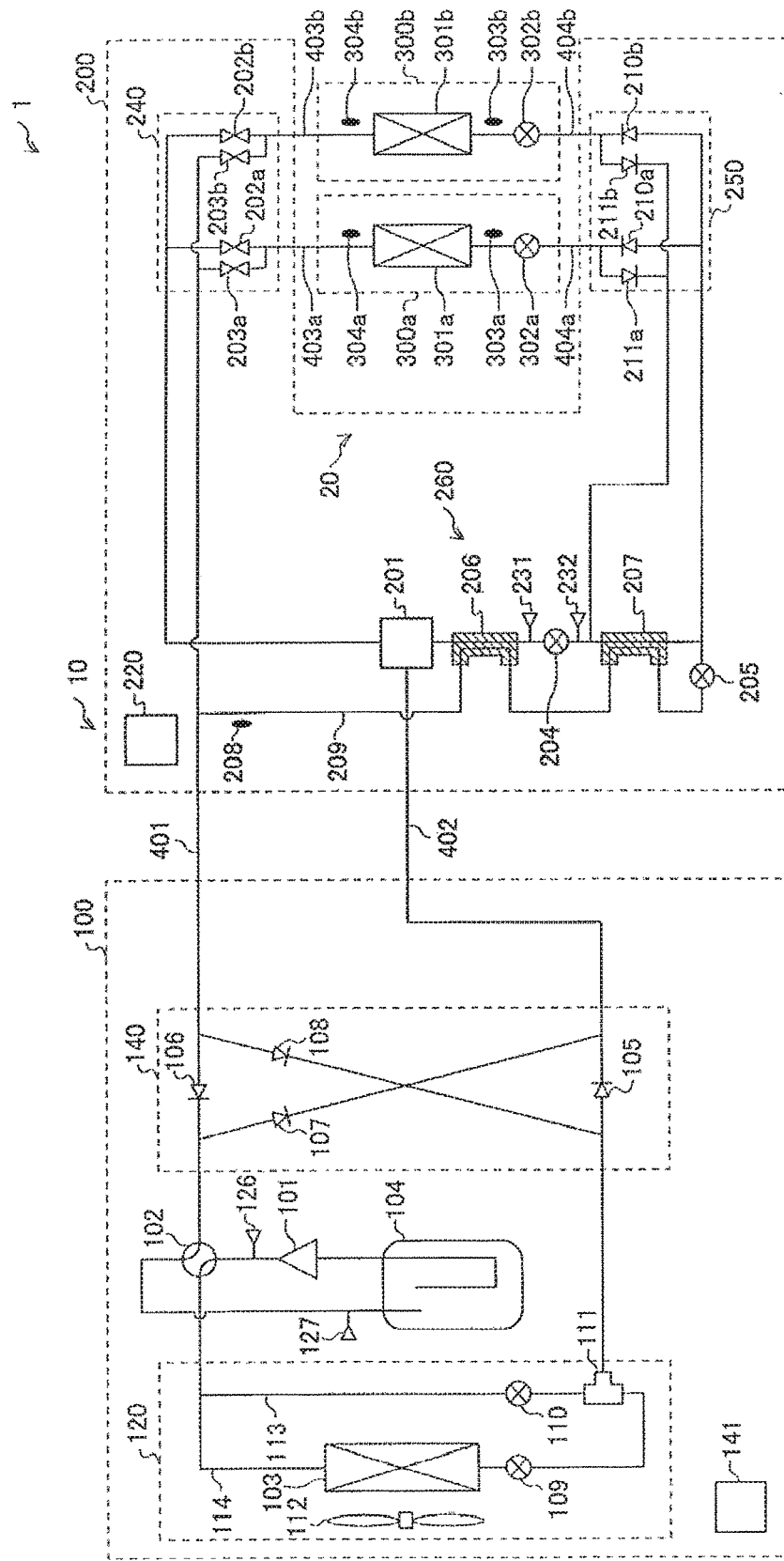
FIG. 1 is a circuit diagram illustrating an air-conditioning apparatus 1 according to Embodiment 1 of the present invention.

Hereinafter, an air-conditioning apparatus according to an embodiment of the present invention will be described with reference to the drawings. FIG. 1 is a circuit diagram illustrating an air-conditioning apparatus 1 according to Embodiment 1 of the present invention. The air-conditioning apparatus 1 will be described with reference to FIG. 1. As illustrated in FIG. 1, the air-conditioning apparatus 1 includes a heat source unit 100, a plurality of indoor units 300a and 300b, a relay unit 200, and a control unit 10. In Embodiment 1, a description will be given of a case where the two indoor units 300a and 300b are connected to the single heat source unit 100, but the number of heat source units 100 may be two or more. Also, the number of indoor units 300a and 300b may be three or more.

As illustrated in FIG. 1, in the air-conditioning apparatus 1, the heat source unit 100, the indoor units 300a and 300b, and the relay unit 200 are connected to each other. The heat source unit 100 has a function of supplying heating energy or cooling energy to the two indoor units 300a and 300b. The two indoor units 300a and 300b are connected in parallel to each other and have the same configuration. The indoor units 300a and 300b each have a function of cooling or heating an air-conditioned space, such as the inside of a room, by using the heating energy or cooling energy supplied from the heat source unit 100. The relay unit 200 is between the heat source unit 100 and the indoor units 300a and 300b and has a function of switching flows of refrigerant supplied from the heat source unit 100 in accordance with a request from the indoor units 300a and 300b.

The air-conditioning apparatus 1 also includes a load capacity measuring unit 20 that measures cooling-heating load capacities of the plurality of indoor units 300a and 300b. Here, the cooling-heating load capacities mean the cooling load capacity and the heating load capacity in the plurality of indoor units 300a and 300b. The load capacity measuring unit 20 includes liquid pipe temperature measuring units 303a and 303b and gas pipe temperature measuring units 304a and 304b.

Here, the heat source unit 100 and the relay unit 200 are connected to each other, on a high-pressure side, by a high-pressure pipe 402 through which high-pressure refrigerant flows and are connected to each other, on a low-pressure side, by a low-pressure pipe 401 through which low-pressure refrigerant flows. The relay unit 200 and the indoor unit 300a are connected to each other by a gas branch pipe 403a, and the relay unit 200 and the indoor unit 300b are connected to each other by a gas branch pipe 403b. Refrigerant in a gas state mainly flows through the gas branch pipes 403a and 403b. Also, the relay unit 200 and the indoor unit 300a are connected to each other by a liquid branch pipe 404a, and the relay unit 200 and the indoor unit 300b are connected to each other by a liquid branch pipe 404b. Refrigerant in a liquid state mainly flows through the liquid branch pipes 404a and 404b.

(Heat Source Unit 100)

The heat source unit 100 includes a compressor 101 whose capacity is variable, a flow switching valve 102 for switching directions in which refrigerant flows in the heat source unit 100, a heat-source-side heat exchange unit 120, an accumulator 104 that is connected to a suction side of the compressor 101 via the flow switching valve 102 and that accumulates refrigerant in a liquid state, and a heat-source-side flow direction control unit 140 that controls a direction in which refrigerant flows. The heat source unit 100 has a function of supplying heating energy or cooling energy to the indoor units 300a and 300b. The flow switching valve 102 is a four-way valve in this example. Alternatively, the flow switching valve 102 may be formed by combining a two-way valve, a three-way valve, or other valves.

The heat-source-side heat exchange unit 120 includes a main pipe 114, a heat-source-side heat exchanger 103, a heat-source-side fan 112, a bypass pipe 113, a heat-source-side flow control valve 109, a bypass flow control valve 110, and a gas-liquid separating unit 111.

The heat-source-side heat exchanger 103 acts as an evaporator or a condenser. The heat-source-side heat exchanger 103 exchanges heat between refrigerant and outdoor air when the heat-source-side heat exchanger 103 is of air-cooled type, and exchanges heat between refrigerant and water, brine, or other related substance when the heat-source-side heat exchanger 103 is of water-cooled type. The heat-source-side fan 112 changes a flow rate of air to be sent to the heat-source-side heat exchanger 103 and controls a heat exchange capacity. The main pipe 114 is connected to the flow switching valve 102 at one end, is connected to the high-pressure pipe 402 at the other end, and is provided with the heat-source-side heat exchanger 103 and the heat-source-side flow control valve 109. The bypass pipe 113 is connected to the flow switching valve 102 at one end, is connected to the high-pressure pipe 402 at the other end, and is connected in parallel to the main pipe 114. The refrigerant flowing through the bypass pipe 113 does not pass through the heat-source-side heat exchanger 103 and is not subjected to heat exchange.

The heat-source-side flow control valve 109 is connected in series to the heat-source-side heat exchanger 103 in the main pipe 114 and controls the flow rate of refrigerant flowing through the main pipe 114. The heat-source-side flow control valve 109 is composed of, for example, an electric expansion valve with a variable opening degree or other valve. The bypass flow control valve 110 is provided in the bypass pipe 113 and controls the flow rate of refrigerant flowing through the bypass pipe 113. The bypass flow control valve 110 is composed of, for example, an electric expansion valve with a variable opening degree or other valve.

The gas-liquid separating unit 111 separates refrigerant in a liquid state and refrigerant in a gas state from each other. In the gas-liquid separating unit 111, a liquid passage side through which refrigerant in a liquid state passes is connected to the main pipe 114, a gas passage side through which refrigerant in a gas state passes is connected to the bypass pipe 113, and a mixture side through which refrigerant in a liquid state and refrigerant in a gas state pass is connected to the low-pressure pipe 401 and the high-pressure pipe 402. When refrigerant flows out to the high-pressure pipe 402, the gas-liquid separating unit 111 mixes refrigerant flowing through the main pipe 114 and refrigerant flowing through the bypass pipe 113 and causes mixed refrigerant to flow out to the high-pressure pipe 402. When refrigerant flows in from the low-pressure pipe 401, the gas-liquid separating unit 111 separates the refrigerant flowing in from the low-pressure pipe 401 into refrigerant flowing into the main pipe 114 and refrigerant flowing into the bypass pipe 113.

The gas-liquid separating unit 111 may be composed of, for example, a T-shaped pipe or other pipe, or may be composed of a pipe whose connection portion is processed so that refrigerant in a gas state can be easily obtained. Here, the gas-liquid separating unit 111 may have efficiency of separating refrigerant in a gas state and refrigerant in a liquid state from each other of 100% or less, and may have a shape for achieving separation efficiency corresponding to the required specifications of products.

The heat-source-side flow direction control unit 140 includes a third check valve 105, a fourth check valve 106, a fifth check valve 107, and a sixth check valve 108. The third check valve 105 is provided in a pipe that connects the heat-source-side heat exchange unit 120 and the high-pressure pipe 402 and allows a flow of refrigerant from the heat-source-side heat exchange unit 120 toward the high-pressure pipe 402. The fourth check valve 106 is provided in a pipe that connects the flow switching valve 102 of the hear source unit 100 and the low-pressure pipe 401 and allows a flow of refrigerant from the low-pressure pipe 401 toward the flow switching valve 102. The fifth check valve 107 is provided in a pipe that connects the flow switching valve 102 of the hear source unit 100 and the high-pressure pipe 402 and allows a flow of refrigerant from the flow switching valve 102 toward the high-pressure pipe 402. The sixth check valve 108 is provided in a pipe that connects the heat-source-side heat exchange unit 120 and the low-pressure pipe 401 and allows a flow of refrigerant from the low-pressure pipe 401 toward the heat-source-side heat exchange unit 120.

The heat source unit 100 also includes a discharge pressure measuring unit 126. The discharge pressure measuring unit 126 is provided in a pipe that connects the flow switching valve 102 and the discharge side of the compressor 101 and measures a discharge pressure of the compressor 101. The discharge pressure measuring unit 126 is composed of, for example, a sensor or other device, and transmits a signal representing a measured discharge pressure to the control unit 10. The discharge pressure measuring unit 126 may include a storage device or other device. In this case, the discharge pressure measuring unit 126 stores data of measured discharge pressure in the storage device or other device for a predetermined period of time, and transmits, at a predetermined interval, a signal including the data of measured discharge pressure to the control unit 10.

The heat source unit 100 also includes a suction pressure measuring unit 127. The suction pressure measuring unit 127 is provided in a pipe that connects the flow switching valve 102 and the accumulator 104 and measures a suction pressure of the compressor 101. The suction pressure measuring unit 127 is composed of, for example, a sensor or other device, and transmits a signal representing a measured suction pressure to the control unit 10. The suction pressure measuring unit 127 may include a storage device or other device. In this case, the suction pressure measuring unit 127 stores data of measured suction pressure in the storage device or other device for a predetermined period of time, and transmits, at a predetermined interval, a signal including the data of measured suction pressure to the control unit 10.

(Indoor Units 300a and 300b)

The indoor units 300a and 300b respectively include load-side heat exchangers 301a and 301b that act as a condenser or evaporator and load-side flow control valves 302a and 302b that control a flow rate of refrigerant circulating through the indoor units 300a and 300b. The indoor units 300a and 300b each have a function of cooling or heating an air-conditioned space, such as the inside of a room, by using cooling energy or heating energy supplied from the heat source unit 100. The load-side flow control valves 302a and 302b are each composed of, for example, an electric expansion valve with a variable opening degree or other valve. During a cooling operation, the load-side flow control valves 302a and 302b are respectively controlled depending on superheat amounts on the exit sides of the load-side heat exchangers 301a and 301b. During a heating operation, the load-side flow control valves 302a and 302b are respectively controlled depending on subcooling amounts on the exit sides of the load-side heat exchangers 301a and 301b.

The indoor units 300a and 300b respectively include the gas pipe temperature measuring units 304a and 304b and the liquid pipe temperature measuring units 303a and 303b. The gas pipe temperature measuring unit 304a is provided between the load-side heat exchanger 301a and the relay unit 200 and measures a temperature of a refrigerant stream flowing through the gas branch pipe 403a that connects the load-side heat exchanger 301a and the relay unit 200, and the gas pipe temperature measuring unit 304b is provided between the load-side heat exchanger 301b and the relay unit 200 and measures a temperature of a refrigerant stream flowing through the gas branch pipe 403b that connects the load-side heat exchanger 301b and the relay unit 200. The gas pipe temperature measuring units 304a and 304b are each composed of, for example, a thermistor or other device, and transmit a signal representing a measured temperature to the control unit 10. The gas pipe temperature measuring units 304a and 304b may each include a storage device or other device. In this case, the gas pipe temperature measuring units 304a and 304b each store data of measured temperature in the storage device or other device for a predetermined period of time, and transmit, at a predetermined interval, a signal including the data of measured temperature to the control unit 10.

The liquid pipe temperature measuring units 303a and 303b are respectively provided between the load-side heat exchangers 301a and 301b and the load-side flow control valves 302a and 302b and respectively measure temperatures of refrigerant streams flowing through the liquid branch pipes 404a and 404b that connect the load-side heat exchangers 301a and 301b and the load-side flow control valves 302a and 302b. The liquid pipe temperature measuring units 303a and 303b are each composed of, for example, a thermistor or other device, and transmit a signal representing a measured temperature to the control unit 10. The liquid pipe temperature measuring units 303a and 303b may each include a storage device or other device. In this case, the liquid pipe temperature measuring units 303a and 303b each store data of measured temperature in the storage device or other device for a predetermined period of time, and transmit, at a predetermined interval, a signal including the data of measured temperature to the control unit 10.

(Relay Unit 200)

The relay unit 200 includes a first branch portion 240, a second branch portion 250, a gas-liquid separator 201, a relay bypass pipe 209, a liquid-outflow-side flow control valve 204, a heat exchange unit 260, and a relay bypass flow control valve 205. The relay unit 200 is interposed between the heat source unit 100 and the indoor units 300a and 300b and has a function of switching flows of refrigerant supplied from the heat source unit 100 in response to requests from the indoor units 300a and 300b and distributing the refrigerant supplied from the heat source unit 100 to the plurality of indoor units 300a and 300b.

The first branch portion 240 is connected to the gas branch pipes 403a and 403b at one end and is connected to the low-pressure pipe 401 and the high-pressure pipe 402 at the other end. In the first branch portion 240, a direction in which refrigerant circulates during a cooling operation is different from a direction in which refrigerant circulates during a heating operation. The first branch portion 240 includes heating solenoid valves 202a and 202b and cooling solenoid valves 203a and 203b. The heating solenoid valves 202a and 202b are respectively connected to the gas branch pipes 403a and 403b at one ends, and are connected to the high-pressure pipe 402 at the other ends. The heating solenoid valves 202a and 202b are open during a heating operation and are closed during a cooling operation. The cooling solenoid valves 203a and 203b are respectively connected to the gas branch pipes 403a and 403b at one ends, and are connected to the low-pressure pipe 401 at the other ends. The cooling solenoid valves 203a and 203b are open during a cooling operation and are closed during a heating operation.

The second branch portion 250 is connected to the liquid branch pipes 404a and 404b at one end and is connected to the low-pressure pipe 401 and the high-pressure pipe 402 at the other end. In the second branch portion 250, a direction in which refrigerant circulates during a cooling operation is different from a direction in which refrigerant circulates during a heating operation. The second branch portion 250 includes first check valves 210a and 210b and second check valves 211a and 211b.

The first check valves 210a and 210b are respectively connected to the liquid branch pipes 404a and 404b at one ends, are connected to the high-pressure pipe 402 at the other ends, and allow flows of refrigerant streams from the high-pressure pipe 402 toward the liquid branch pipes 404a and 404b.

The second check valves 211a and 211b are respectively connected to the liquid branch pipes 404a and 404b at one ends, are connected to the low-pressure pipe 401 at the other ends, and allow flows of refrigerant streams from the liquid branch pipes 404a and 404b toward the high-pressure pipe 402.

The gas-liquid separator 201 separates refrigerant in a gas state and refrigerant in a liquid state from each other. The gas-liquid separator 201 is connected to the high-pressure pipe 402 at an inflow side, is connected to the first branch portion 240 at a gas outflow side, and is connected to the second branch portion 250 at a liquid outflow side. The relay bypass pipe 209 connects the second branch portion 250 and the low-pressure pipe 401. The liquid-outflow-side flow control valve 204 is connected to the liquid outflow side of the gas-liquid separator 201 and is composed of, for example, an electric expansion valve with a variable opening degree or other valve. The liquid-outflow-side flow control valve 204 controls a flow rate of refrigerant in a liquid state that flows out of the gas-liquid separator 201.

The heat exchange unit 260 includes a first heat exchange unit 206 and a second heat exchange unit 207. The first heat exchange unit 206 is provided between the liquid outflow side of the gas-liquid separator 201 and the liquid-outflow-side flow control valve 204 and in the relay bypass pipe 209. The first heat exchange unit 206 performs heat exchange between refrigerant in a liquid state flowing out of the gas-liquid separator 201 and refrigerant flowing through the relay bypass pipe 209. The second heat exchange unit 207 is provided on the downstream side of the liquid-outflow-side flow control valve 204 and in the relay bypass pipe 209. The second heat exchange unit 207 performs heat exchange between refrigerant flowing out of the liquid-outflow-side flow control valve 204 and refrigerant flowing through the relay bypass pipe 209.

The relay bypass flow control valve 205 is connected to the upstream side of the second heat exchange unit 207 in the relay bypass pipe 209 and is composed of, for example, an electric expansion valve with a variable opening degree or other valve. The relay bypass flow control valve 205 controls a flow rate of refrigerant flowed into the relay bypass pipe 209 in the refrigerant flowing out of the second heat exchange unit 207.

The upstream sides of the first check valves 210a and 210b are connected to the downstream side of the second heat exchange unit 207 and to the relay bypass pipe 209. Thus, the refrigerant flowed out of the second heat exchange unit 207 branches into a refrigerant stream that flows toward the first check valves 210a and 210b and a refrigerant stream that flows into the relay bypass pipe 209. The downstream sides of the second check valves 211a and 211b are connected between the liquid-outflow-side flow control valve 204 and the upstream side of the second heat exchange unit 207. That is, the refrigerant flowed out of the second check valves 211a and 211b flows into the second heat exchange unit 207, is subjected to heat exchange, and then branches into a refrigerant stream that flows toward the first check valves 210a and 210b and a refrigerant stream that flows into the relay bypass pipe 209.

The relay unit 200 also includes a liquid outflow pressure measuring unit 231, a downstream-side liquid outflow pressure measuring unit 232, and a relay bypass temperature measuring unit 208. The liquid outflow pressure measuring unit 231 is provided between the first heat exchange unit 206 and the upstream side of the liquid-outflow-side flow control valve 204 and measures a pressure of refrigerant on the liquid outflow side of the gas-liquid separator 201. The liquid outflow pressure measuring unit 231 is composed of, for example, a sensor or other device, and transmits a signal representing a measured pressure to the control unit 10. The liquid outflow pressure measuring unit 231 may include a storage device or other device. In this case, the liquid outflow pressure measuring unit 231 stores data of measured pressure in the storage device or other device for a predetermined period of time, and transmits, at a predetermined interval, a signal including the data of measured pressure to the control unit 10.

The downstream-side liquid outflow pressure measuring unit 232 is provided between the downstream side of the liquid-outflow-side flow control valve 204 and the second heat exchange unit 207 and measures a pressure of refrigerant flowed out of the liquid-outflow-side flow control valve 204. The downstream-side liquid outflow pressure measuring unit 232 is composed of, for example, a sensor or other device, and transmits a signal representing a measured pressure to the control unit 10. The downstream-side liquid outflow pressure measuring unit 232 may include a storage device or other device. In this case, the downstream-side liquid outflow pressure measuring unit 232 stores data of measured pressure in the storage device or other device for a predetermined period of time, and transmits, at a predetermined interval, a signal including the data of measured pressure to the control unit 10. Here, the opening degree of the liquid-outflow-side flow control valve 204 is controlled so that a difference between a pressure measured by the liquid outflow pressure measuring unit 231 and a pressure measured by the downstream-side liquid outflow pressure measuring unit 232 is constant.

The relay bypass temperature measuring unit 208 is provided in the relay bypass pipe 209 and measures a pressure of refrigerant flowing through the relay bypass pipe 209. The relay bypass temperature measuring unit 208 is composed of, for example, a thermistor or other device, and transmits a signal representing a measured temperature to the control unit 10. The relay bypass temperature measuring unit 208 may include a storage device or other device. In this case, the relay bypass temperature measuring unit 208 stores data of measured temperature in the storage device or other device for a predetermined period of time, and transmits, at a predetermined interval, a signal including the data of measured temperature to the control unit 10. Here, the opening degree of the relay bypass flow control valve 205 is controlled on the basis of at least one or more of a pressure measured by the liquid outflow pressure measuring unit 231, a pressure measured by the downstream-side liquid outflow pressure measuring unit 232, and a temperature measured by the relay bypass temperature measuring unit 208.

(Refrigerant)

In the air-conditioning apparatus 1, refrigerant is filled in the pipes. The refrigerant used here may be, for example, a natural refrigerant, such as carbon dioxide ($CO_2$), hydrocarbon, and helium, a Freon alternative refrigerant not containing chlorine, such as HFC410A, HFC407C, and HFC404A, or a Freon refrigerant used for existing products, such as R22 and R134a. HFC407C is a zeotropic refrigerant mixture of R32, R125, and R134a of HFC that are mixed at a ratio of 23 wt %, 25 wt %, and 52 wt %, respectively. Alternatively, a heat medium, not refrigerant, may be filled in the pipes of the air-conditioning apparatus 1. The heat medium may be, for example, water, brine, or other related substance.

(Control Unit 10)

The control unit 10 controls the overall system of the air-conditioning apparatus 1 and is composed of, for example, a microprocessor unit including a CPU, a memory, and other devices. The control unit 10 controls the driving frequency of the compressor 101, the rotation speeds of the heat-source-side fan 112 and indoor fans (not illustrated) provided in the load-side heat exchangers 301a and 301b, switching of the flow switching valve 102, opening and closing of the heating solenoid valves 202a and 202b and the cooling solenoid valves 203a and 203b, the opening degrees of the heat-source-side flow control valve 109, the bypass flow control valve 110, the load-side flow control valves 302a and 302b, the liquid-outflow-side flow control valve 204, and the relay bypass flow control valve 205, and other operation, on the basis of measurement information received from the gas pipe temperature measuring units 304a and 304b, the liquid pipe temperature measuring units 303a and 303b, the liquid outflow pressure measuring unit 231, the downstream-side liquid outflow pressure measuring unit 232, the relay bypass temperature measuring unit 208, the discharge pressure measuring unit 126, and the suction pressure measuring unit 127, and instructions received from a remote control (not illustrated).

The control unit 10 is constituted by a controller 141 provided in the heat source unit 100 and a controller 220 provided in the relay unit 200. Alternatively, the control unit 10 may be mounted in any one or all of the heat source unit 100, the indoor units 300a and 300b, and the relay unit 200. Alternatively, the control unit 10 may be mounted separately from the heat source unit 100, the indoor units 300a and 300b, and the relay unit 200. The controller 141 and the controller 220 are connected to each other to be capable of communicating with each other in a wireless or wired manner and are capable of transmitting and receiving various data and other related information to and from each other. Alternatively, the control unit 10 may be constituted by a single controller.

Figure 2:
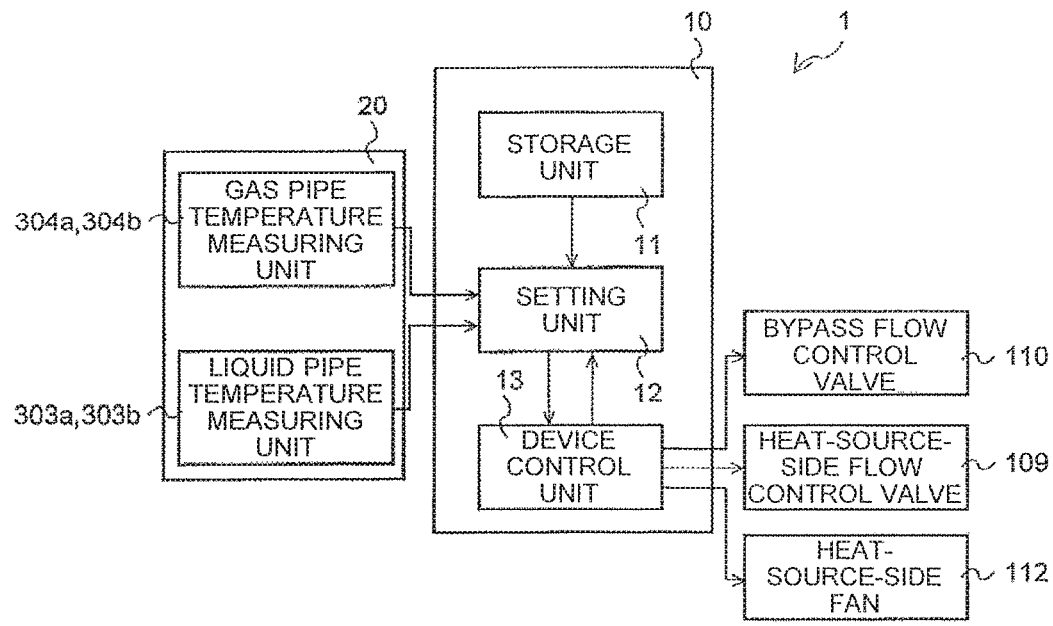
FIG. 2 is a block diagram illustrating a control unit 10 of the air-conditioning apparatus 1 according to Embodiment 1 of the present invention.

FIG. 2 is a block diagram illustrating the control unit 10 of the air-conditioning apparatus 1 according to Embodiment 1 of the present invention. As illustrated in FIG. 2, the control unit 10 includes a storage unit 11, a setting unit 12, and a device control unit 13.

(Storage Unit 11)

The storage unit 11 stores an opening degree table and an airflow table in which cooling-heating load capacities of the plurality of indoor units 300a and 300b are associated with an opening degree control value of the bypass flow control valve 110, an opening degree control value of the heat-source-side flow control valve 109, and an output of the heat-source-side fan 112. Specifically, in the opening degree table and the airflow table, a load ratio of a cooling load capacity to a heating load capacity of the plurality of indoor units 300a and 300b is associated with a target temperature of the heat-source-side heat exchanger 103, and the target temperature is associated with the opening degree control value of the bypass flow control valve 110, the opening degree control value of the heat-source-side flow control valve 109, and the output of the heat-source-side fan 112.

Figure 3:
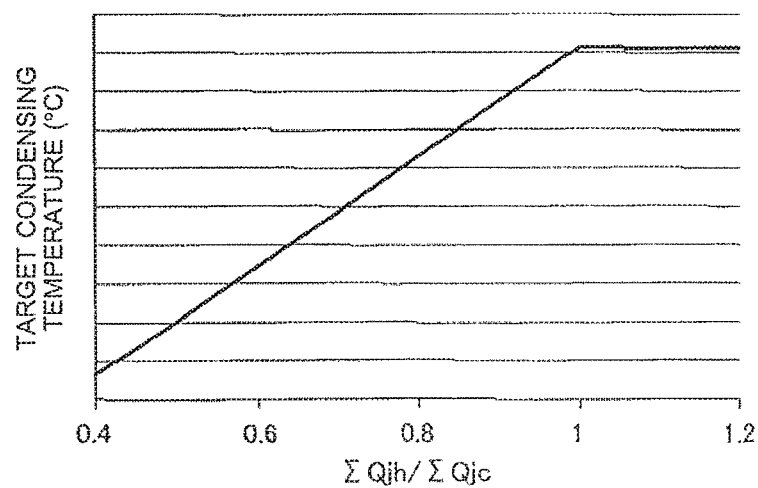
FIG. 3 is a graph illustrating a relationship between a heating-cooling capacity ratio and a target condensing temperature in Embodiment 1 of the present invention.

FIG. 3 is a graph illustrating a relationship between a heating-cooling capacity ratio and a target condensing temperature in Embodiment 1 of the present invention. First, a description will be given of a cooling main operation in which the heat-source-side heat exchanger 103 acts as a condenser. In FIG. 3, the horizontal axis represents a heating-cooling capacity ratio ΣQjh/ΣQjc that is calculated by dividing a total heat amount for heating ΣQjh by a total heat amount for cooling ΣQjc, and the vertical axis represents a target condensing temperature (degrees C.) of the heat-source-side heat exchanger 103. As illustrated in FIG. 3, in the cooling main operation, the heating-cooling capacity ratio ΣQjh/ΣQjc increases as the ratio of a heating operation capacity increases, and consequently, the target condensing temperature rises. This is because the condensation ability of the heat-source-side heat exchanger 103 needs to be decreased to ensure the heating ability as the ratio of a heating operation capacity increases. The condensation ability of the heat-source-side heat exchanger 103 is decreased when the condensing temperature, that is, the high-pressure side pressure, of the heat-source-side heat exchanger 103 is increased and controlled with desired quality.

Figure 4:
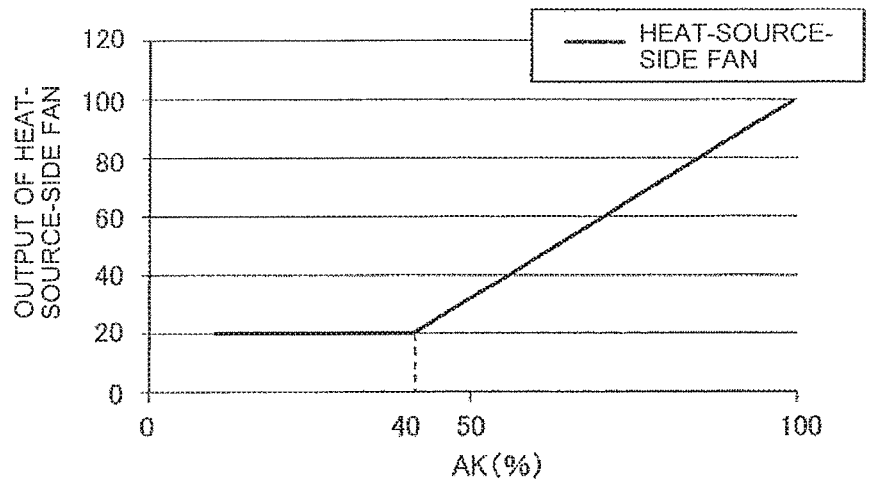
FIG. 4 is a graph illustrating a relationship between AK and an output of a heat-source-side fan 112 in Embodiment 1 of the present invention.

FIG. 4 is a graph illustrating a relationship between AK and an output of the heat-source-side fan 112 in Embodiment 1 of the present invention. In FIG. 4, the horizontal axis represents AK (%) and the vertical axis represents an output of the heat-source-side fan 112. Here, AK (%) is an index indicating a heat exchange capacity of the heat-source-side heat exchanger 103 and is a value calculated by multiplying a heat transfer area A (m$^2$) by a heat transmission coefficient K (W/m$^2$) and dividing the product by a predetermined reference value. As illustrated in FIG. 4, as the output of the heat-source-side fan 112 decreases, the heat exchange capacity of the heat-source-side heat exchanger 103 decreases and thus AK decreases. When the target condensing temperature of the heat-source-side heat exchanger 103 increases, AK decreases and thus the output of the heat-source-side fan 112 decreases. That is, in the airflow table, association is made so that, when the ratio of a heating operation capacity increases, the condensation ability of the heat-source-side heat exchanger 103 decreases, the target condensing temperature of the heat-source-side heat exchanger 103 increases, AK decreases, and the output of the heat-source-side fan 112 decreases. In the airflow table, association is made so that the minimum value of the output of the heat-source-side fan 112 is 20%, for example, and that the heat-source-side fan 112 maintains an output of 20% even if AK becomes lower than 40%, for example, and does not stop operating while the heat source unit 100 is operating.

Figure 5:
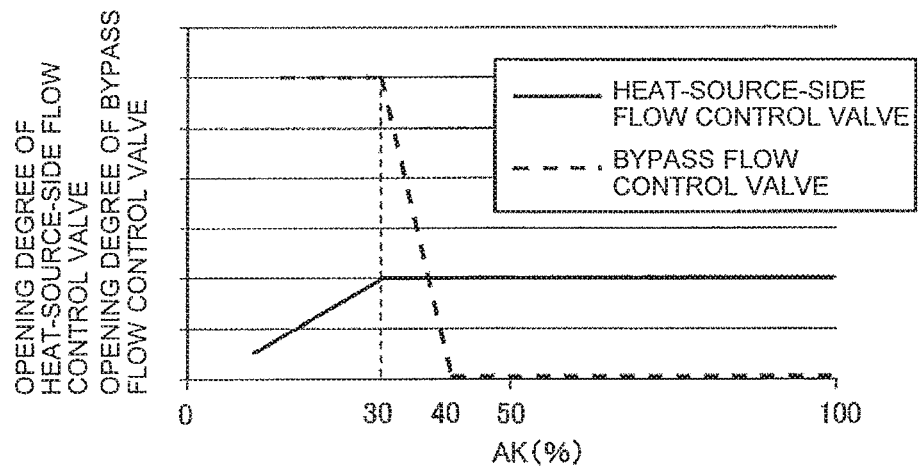
FIG. 5 is a graph illustrating a relationship between AK and an opening degree of a heat-source-side flow control valve 109 and a relationship between AK and an opening degree of a bypass flow control valve 110 in Embodiment 1 of the present invention.

FIG. 5 is a graph illustrating a relationship between AK and an opening degree of the heat-source-side flow control valve 109 and a relationship between AK and an opening degree of the bypass flow control valve 110 in Embodiment 1 of the present invention. In FIG. 5, the horizontal axis represents AK (%) and the vertical axis represents an opening degree of the heat-source-side flow control valve 109 and an opening degree of the bypass flow control valve 110. As illustrated in FIG. 5, as the opening degree of the bypass flow control valve 110 increases, the flow rate of refrigerant flowing through the bypass pipe 113 increases, the flow rate of refrigerant flowing through the heat-source-side heat exchanger 103 in the main pipe 114 decreases, and the heat exchange capacity of the heat-source-side heat exchanger 103 decreases, and thus AK decreases. As the opening degree of the heat-source-side flow control valve 109 decreases, the flow rate of refrigerant flowing through the heat-source-side heat exchanger 103 in the main pipe 114 decreases, and the heat exchange capacity of the heat-source-side heat exchanger 103 decreases, and thus AK decreases.

When the target condensing temperature of the heat-source-side heat exchanger 103 increases, AK decreases, the opening degree of the bypass flow control valve 110 increases, and the opening degree of the heat-source-side flow control valve 109 decreases. That is, in the opening degree table, association is made so that, when the ratio of the heating operation capacity increases, the condensation ability of the heat-source-side heat exchanger 103 decreases, the target condensing temperature of the heat-source-side heat exchanger 103 increases, AK decreases, the opening degree of the bypass flow control valve 110 increases, and the opening degree of the heat-source-side flow control valve 109 decreases. In the opening degree table, association is made so that the bypass flow control valve 110 is fully closed when AK is 40 to 100% and is gradually opened when AK becomes lower than 40%. Also, in the opening degree table, association is made so that the heat-source-side flow control valve 109 is open to some extent when AK is 30 to 100% and is gradually closed when AK becomes lower than 30%.

That is, in Embodiment 1, association is made in the opening degree table and the airflow table so that the output of the heat-source-side fan 112 is decreased when AK is 100 to 40%, the bypass flow control valve 110 is gradually opened when AK is 40 to 30%, and the heat-source-side flow control valve 109 is gradually closed when AK is lower than 30%. In the opening degree table and the airflow table, at least one of the output of the heat-source-side fan 112, the opening degree of the bypass flow control valve 110, and the opening degree of the heat-source-side flow control valve 109 may be associated. In addition, in the opening degree table and the airflow table, among the output of the heat-source-side fan 112, the opening degree of the bypass flow control valve 110, and the opening degree of the heat-source-side flow control valve 109, the opening degree of the bypass flow control valve 110 may be controlled before the output of the heat-source-side fan 112 is controlled in response to a decrease in AK. The order of control is not specified.

Figure 6:
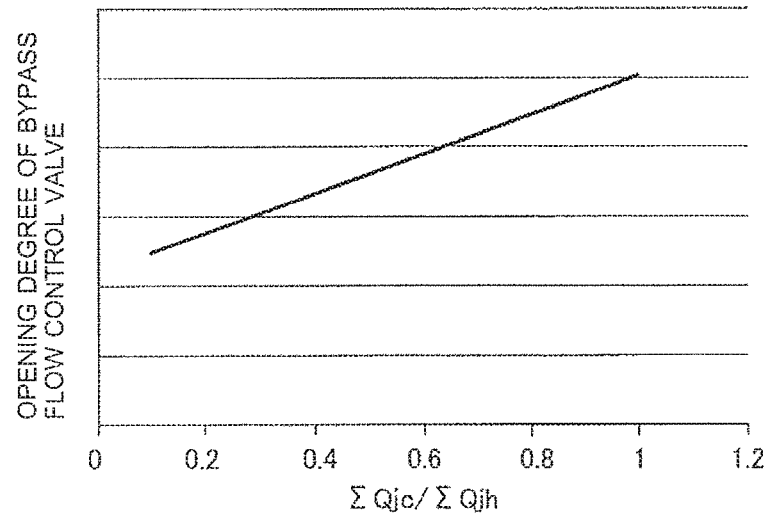
FIG. 6 is a graph illustrating a relationship between a cooling-heating capacity ratio and an opening degree of the bypass flow control valve 110 in Embodiment 1 of the present invention.

FIG. 6 is a graph illustrating a relationship between a cooling-heating capacity ratio and an opening degree of the bypass flow control valve 110 in Embodiment 1 of the present invention. Next, a description will be given of a heating main operation in which the heat-source-side heat exchanger 103 acts as an evaporator. In FIG. 6, the horizontal axis represents a cooling-heating capacity ratio ΣQjc/ΣQjh that is calculated by dividing a total heat amount for cooling ΣQjc by a total heat amount for heating ΣQjh, and the vertical axis represents an opening degree of the bypass flow control valve 110. As illustrated in FIG. 6, in the opening degree table, association is made so that the cooling-heating capacity ratio ΣQjc/ΣQjh increases, the evaporation ability of the heat-source-side heat exchanger 103 decreases, the target evaporating temperature of the heat-source-side heat exchanger 103 rises, AK decreases, and the opening degree of the bypass flow control valve 110 increases as the ratio of a cooling operation capacity increases during the heating main operation. Consequently, the quality on the entry side of the heat-source-side heat exchanger 103 increases, and refrigerant in a gas state flows through the bypass pipe 113.

In the opening degree table, association is made so that the cooling-heating capacity ratio $\Sigma Qjc/\Sigma Qjh$ decreases, the evaporation ability of the heat-source-side heat exchanger 103 increases, the target evaporating temperature of the heat-source-side heat exchanger 103 decreases, AK increases, and the opening degree of the bypass flow control valve 110 decreases as the ratio of a heating operation capacity increases during the heating main operation. In this case, in the refrigerant in two phases caused to flow through the high-pressure pipe 402 by the bypass flow control valve 110 that is slightly opened, refrigerant in a gas state flows through the bypass pipe 113. Thus, pressure loss in the heat-source-side heat exchanger 103 that is caused by an increase in the flow rate of refrigerant flowing through the heat-source-side heat exchanger 103 can be decreased. Also in the heating main operation, in the opening degree table and the airflow table, a cooling-heating capacity operation may be associated with the output of the heat-source-side fan 112 and the opening degree of the heat-source-side flow control valve 109. The association with the opening degree of the bypass flow control valve 110 is not limited to a one-to-one relationship. That is, the opening degree of the bypass flow control valve 110 need not change linearly depending on the cooling-heating capacity ratio $\Sigma Qjc/\Sigma Qjh$ and need not be a function of the cooling-heating capacity ratio $\Sigma Qjc/\Sigma Qjh$, as long as the opening degree of the bypass flow control valve 110 is controlled depending on a cooling load and a heating load.

(Setting Unit 12)

The setting unit 12 compares the cooling-heating capacities of the plurality of indoor units 300a and 300b measured by the load capacity measuring unit 20 with those listed in the opening degree table and the airflow table stored in the storage unit 11 and sets an opening degree of the bypass flow control valve 110, an opening degree of the heat-source-side flow control valve 109, and an output of the heat-source-side fan 112. As described above, the load capacity measuring unit 20 includes the liquid pipe temperature measuring units 303a and 303b and the gas pipe temperature measuring units 304a and 304b. In Embodiment 1, the setting unit 12 calculates a cooling-heating capacity, for example, a load ratio of a cooling load capacity to a heating load capacity, on the basis of a ratio of the total cooling capacity $\Sigma Qjc$ to the total heating capacity $\Sigma Qjh$, which are ability codes of the indoor units 300a and 300b, $\Delta Tc$ calculated by subtracting a target condensing temperature Tcm from a current condensing temperature Tc, and $\Delta Te$ calculated by subtracting a target evaporating temperature Tem from a current evaporating temperature Te. If $\Delta Tc$ is larger than or equal to a predetermined value, the setting unit 12 determines that a condensation load is excessive. If $\Delta Te$ is larger than or equal to a predetermined value, the setting unit 12 determines that an evaporation load is excessive. Furthermore, the setting unit 12 calculates a load ratio of a cooling load capacity to a heating load capacity such that the condition of the total cooling capacity $\Sigma Qjc$ and the total heating capacity $\Sigma Qjh$ is taken into account. For example, if $\Sigma Qjc>\Sigma Qjh$, the setting unit 12 determines that an evaporation load is large. Consequently, the control unit 10 switches the operation modes. To calculate a condensing temperature Tc and an evaporating temperature Te, the temperatures of refrigerant streams circulating through the liquid branch pipes 404a and 404b measured by the liquid pipe temperature measuring units 303a and 303b and the temperatures of refrigerant streams circulating through the gas branch pipes 403a and 403b measured by the gas pipe temperature measuring units 304a and 304b are used, for example.

In addition, the setting unit 12 has a function of determining whether the air-conditioning apparatus 1 is performing a cooling main operation or a heating main operation. Furthermore, the setting unit 12 has a function of determining, in the case of a cooling main operation, whether the target condensing temperature of the heat-source-side heat exchanger 103 is higher than or equal to a threshold of the target condensing temperature. The setting unit 12 may calculate a cooling-heating capacity on the basis of the number of indoor units performing a cooling operation and the number of indoor units performing a heating operation among the plurality of indoor units 300a and 300b. Alternatively, the setting unit 12 may calculate a cooling-heating capacity on the basis of a discharge pressure measured by the discharge pressure measuring unit 126, a suction pressure measured by the suction pressure measuring unit 127, or other related component. In this case, the load capacity measuring unit 20 corresponds to the discharge pressure measuring unit 126 or the suction pressure measuring unit 127. Furthermore, the setting unit 12 may set at least one of an opening degree of the bypass flow control valve 110, an opening degree of the heat-source-side flow control valve 109, and an output of the heat-source-side fan 112.

(Device Control Unit 13)

The device control unit 13 controls an opening degree of the bypass flow control valve 110, an opening degree of the heat-source-side flow control valve 109, and an output of the heat-source-side fan 112 to the opening degree of the bypass flow control valve 110, the opening degree of the heat-source-side flow control valve 109, and the output of the heat-source-side fan 112 that have been set by the setting unit 12. The device control unit 13 may control at least one of an opening degree of the bypass flow control valve 110, an opening degree of the heat-source-side flow control valve 109, and an output of the heat-source-side fan 112.

After the output of the heat-source-side fan 112 is controlled by the device control unit 13, the setting unit 12 determines whether or not the target condensing temperature of the heat-source-side heat exchanger 103 is higher than or equal to the threshold of the target condensing temperature. If the target condensing temperature is lower than the threshold of the target condensing temperature, the setting unit 12 sets an opening degree of the bypass flow control valve 110, and the device control unit 13 controls the opening degree of the bypass flow control valve 110. Subsequently, the setting unit 12 determines again whether or not the target condensing temperature of the heat-source-side heat exchanger 103 is higher than or equal to the threshold of the target condensing temperature. If the target condensing temperature is lower than the threshold of the target condensing temperature, the setting unit 12 sets an opening degree of the heat-source-side flow control valve 109, and the device control unit 13 controls the opening degree of the heat-source-side flow control valve 109.

Next, an operation of the air-conditioning apparatus 1 will be described. The operation modes of the air-conditioning apparatus 1 include a cooling only operation, a heating only operation, a cooling main operation, and a heating main operation. The cooling only operation is a mode in which all the indoor units 300a and 300b perform a cooling operation. The heating only operation is a mode in which all the indoor units 300a and 300b perform a heating operation. The cooling main operation is a mode in which the capacity of a cooling operation is larger than the capacity of a heating operation in a simultaneous cooling and heating operation. The heating main operation is a mode in which the capacity of a heating operation is larger than the capacity of a cooling operation in a simultaneous cooling and heating operation. In FIGS. 7 to 10, a flow of high-pressure refrigerant is indicated by a solid-line arrow and a flow of low-pressure refrigerant is indicated by a broken-line arrow.

(Cooling Only Operation)

Figure 7:
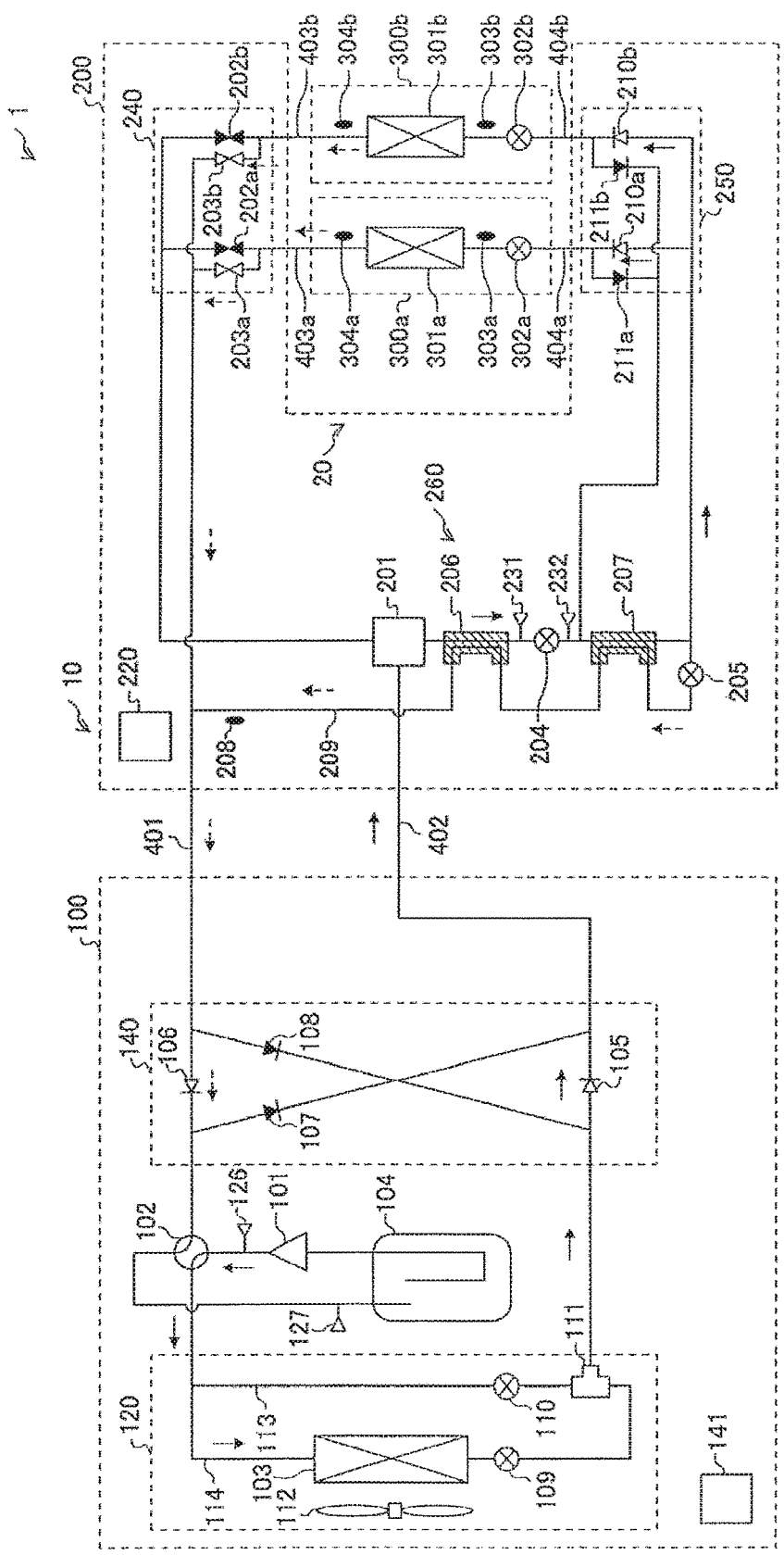
FIG. 7 is a circuit diagram illustrating a state of a cooling only operation of the air-conditioning apparatus 1 according to Embodiment 1 of the present invention.

FIG. 7 is a circuit diagram illustrating a state of a cooling only operation of the air-conditioning apparatus 1 according to Embodiment 1 of the present invention. First, the cooling only operation will be described. In the air-conditioning apparatus 1, all the indoor units 300a and 300b are performing a cooling operation. As illustrated in FIG. 7, high-temperature and high-pressure gas refrigerant discharged from the compressor 101 passes through the flow switching valve 102, is subjected to heat exchange, performed by the heat-source-side heat exchanger 103, with outdoor air sent by the heat-source-side fan 112, and is condensed and liquefied. Subsequently, the condensed and liquefied refrigerant passes through the heat-source-side flow control valve 109, the gas-liquid separating unit 111, the third check valve 105, and the high-pressure pipe 402 and reaches the gas-liquid separator 201. Here, the bypass flow control valve 110 is fully closed and thus no refrigerant flows through the bypass pipe 113.

Subsequently, the refrigerant is separated by the gas-liquid separator 201 into refrigerant in a gas state and refrigerant in a liquid state. The refrigerant in a liquid state flows out from the liquid outflow side, passes through the first heat exchange unit 206, the liquid-outflow-side flow control valve 204, and the second heat exchange unit 207 in this order, and branches into refrigerant streams in the second branch portion 250. The refrigerant streams respectively flow into the indoor units 300a and 300b through the first check valves 210a and 210b and the liquid branch pipes 404a and 404b.

The refrigerant steams flowed into the indoor units 300a and 300b are respectively decompressed to a low pressure by the load-side flow control valves 302a and 302b that are respectively controlled with superheat amounts on the exit sides of the load-side heat exchangers 301a and 301b. The decompressed refrigerant streams respectively flow into the load-side heat exchangers 301a and 301b, are subjected to heat exchange, performed by the load-side heat exchangers 301a and 301b, with indoor air, and are evaporated and gasified. At this time, all rooms are cooled. Subsequently, the gasified refrigerant steams respectively pass through the gas branch pipes 403a and 403b and the cooling solenoid valves 203a and 203b in the first branch portion 240, join together, and the combined refrigerant passes through the low-pressure pipe 401.

A part of the refrigerant passed through the second heat exchange unit 207 flows into the relay bypass pipe 209. The refrigerant flowed into the relay bypass pipe 209 is decompressed to a low pressure by the relay bypass flow control valve 205, is subjected to heat exchange, performed by the second heat exchange unit 207, with the refrigerant passed through the liquid-outflow-side flow control valve 204, that is, the refrigerant that is to branch into the relay bypass pipe 209, and is evaporated. Furthermore, the refrigerant is subjected to heat exchange, performed by the first heat exchange unit 206, with the refrigerant that is to flow into the liquid-outflow-side flow control valve 204 and is evaporated. The evaporated refrigerant flows into the low-pressure pipe 401 and joins the refrigerant passed through the cooling solenoid valves 203a and 203b. Subsequently, the combined refrigerant passes through the fourth check valve 106, the flow switching valve 102, and the accumulator 104, and is suctioned into the compressor 101.

In the cooling only operation, the heating solenoid valves 202a and 202b are closed, whereas the cooling solenoid valves 203a and 203b are open. As the low-pressure pipe 401 is at a low pressure and the high-pressure pipe 402 is at a high pressure, refrigerant circulates through the third check valve 105 and the fourth check valve 106. As the pressure in the liquid branch pipes 404a and 404b is lower than that in the high-pressure pipe 402, no refrigerant flows through the second check valves 211a and 211b. In addition, as the bypass flow control valve 110 is closed, no refrigerant flows through the bypass pipe 113.

(Heating Only Operation)

Figure 8:
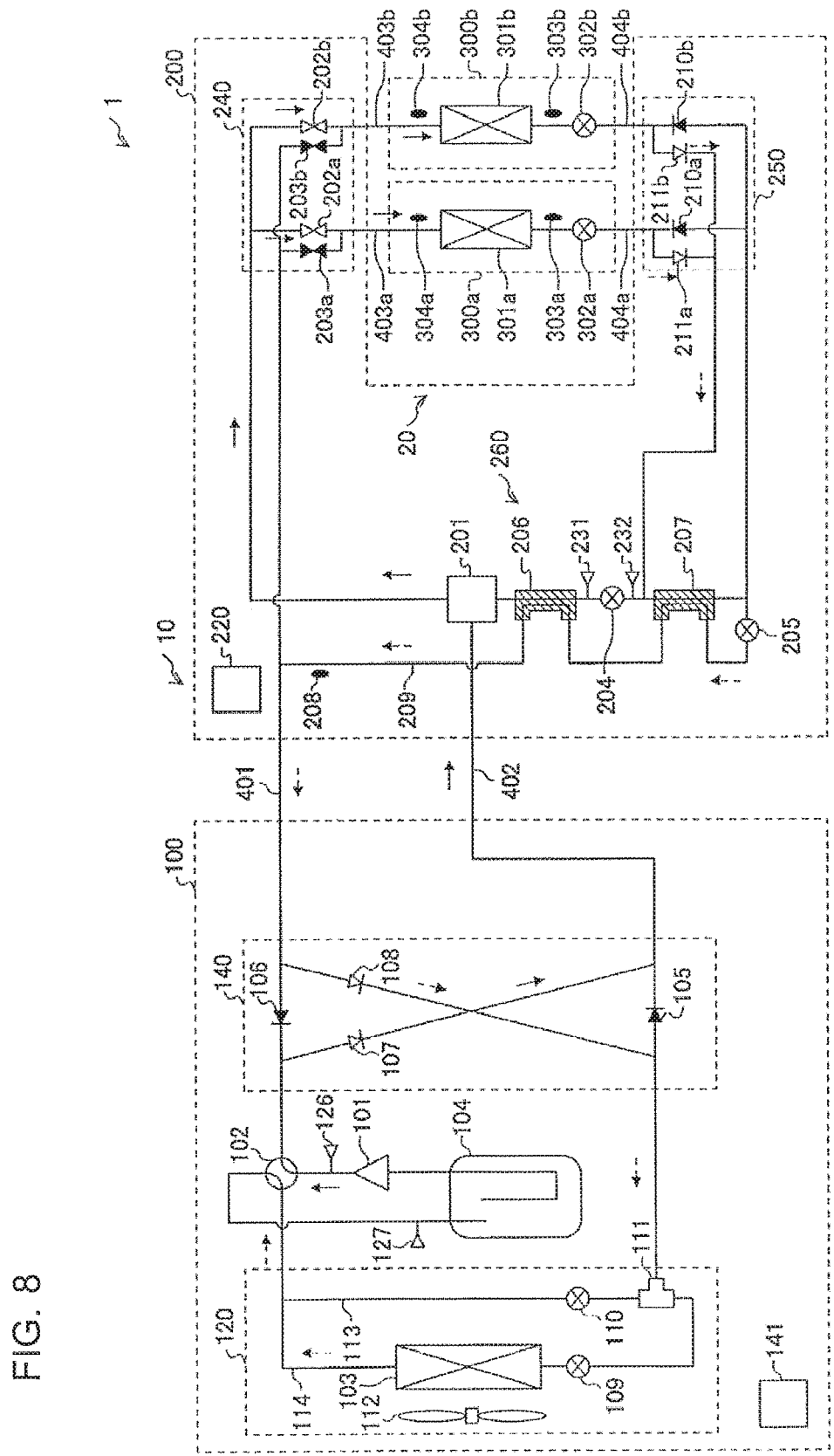
FIG. 8 is a circuit diagram illustrating a state of a heating only operation of the air-conditioning apparatus 1 according to Embodiment 1 of the present invention.

FIG. 8 is a circuit diagram illustrating a state of a heating only operation of the air-conditioning apparatus 1 according to Embodiment 1 of the present invention. Next, the heating only operation will be described. In the air-conditioning apparatus 1, all the indoor units 300a and 300b are performing a heating operation. As illustrated in FIG. 8, high-temperature and high-pressure gas refrigerant discharged from the compressor 101 passes through the flow switching valve 102, passes through the fifth check valve 107 and the high-pressure pipe 402, and reaches the gas-liquid separator 201. Here, the bypass flow control valve 110 is fully closed, and thus no refrigerant flows through the bypass pipe 113.

The refrigerant is separated by the gas-liquid separator 201 into refrigerant in a gas state and refrigerant in a liquid state. The refrigerant in a gas state flows out from the gas outflow side of the gas-liquid separator 201 and branches into refrigerant streams in the first branch portion 240. The refrigerant streams respectively flow into the indoor units 300a and 300b through the heating solenoid valves 202a and 202b and the gas branch pipes 403a and 403b. The refrigerant steams flowed into the indoor units 300a and 300b are subjected to heat exchange, performed by the load-side heat exchangers 301a and 301b, with indoor air, and are condensed and liquefied. At this time, all rooms are heated. Subsequently, the condensed and liquefied refrigerant streams pass through the respective load-side flow control valves 302a and 302b that are respectively controlled with subcooling amounts on the exit sides of the load-side heat exchangers 301a and 301b.

The refrigerant streams passed through the load-side flow control valves 302a and 302b respectively pass through the liquid branch pipes 404a and 404b and the second check valves 211a and 211b of the second branch portion 250 and then join together. The combined refrigerant passes through the second heat exchange unit 207, flows into the relay bypass pipe 209, is decompressed to a low pressure by the relay bypass flow control valve 205, is subjected to heat exchange, performed by the second heat exchange unit 207, with the refrigerant passed through the liquid-outflow-side flow control valve 204, that is, the refrigerant that is to branch into the relay bypass pipe 209, and is evaporated. Furthermore, the refrigerant is subjected to heat exchange, performed by the first heat exchange unit 206, with the refrigerant that is to flow into the liquid-outflow-side flow control valve 204, and is evaporated. The evaporated refrigerant flows into the low-pressure pipe 401, passes through the sixth check valve 108, and flows into the gas-liquid separating unit 111. The refrigerant flowed out of the gas-liquid separating unit 111 is decompressed by the heat-source-side flow control valve 109, is subjected to heat exchange, performed by the heat-source-side heat exchanger 103, with outdoor air sent by the heat-source-side fan 112, and is evaporated and gasified. The gasified refrigerant passes through the flow switching valve 102 and the accumulator 104 and is suctioned into the compressor 101.

In the heating only operation, the heating solenoid valves 202a and 202b are open, whereas the cooling solenoid valves 203a and 203b are closed. As the low-pressure pipe 401 is at a low pressure and the high-pressure pipe 402 is at a high pressure, refrigerant circulates through the fifth check valve 107 and the sixth check valve 108. The liquid-outflow-side flow control valve 204 is closed. As the pressure in the liquid branch pipes 404a and 404b is higher than that in the high-pressure pipe 402, no refrigerant flows through the first check valves 210a and 210b. In addition, as the bypass flow control valve 110 is closed, no refrigerant flows through the bypass pipe 113.

(Cooling Main Operation)

Figure 9:
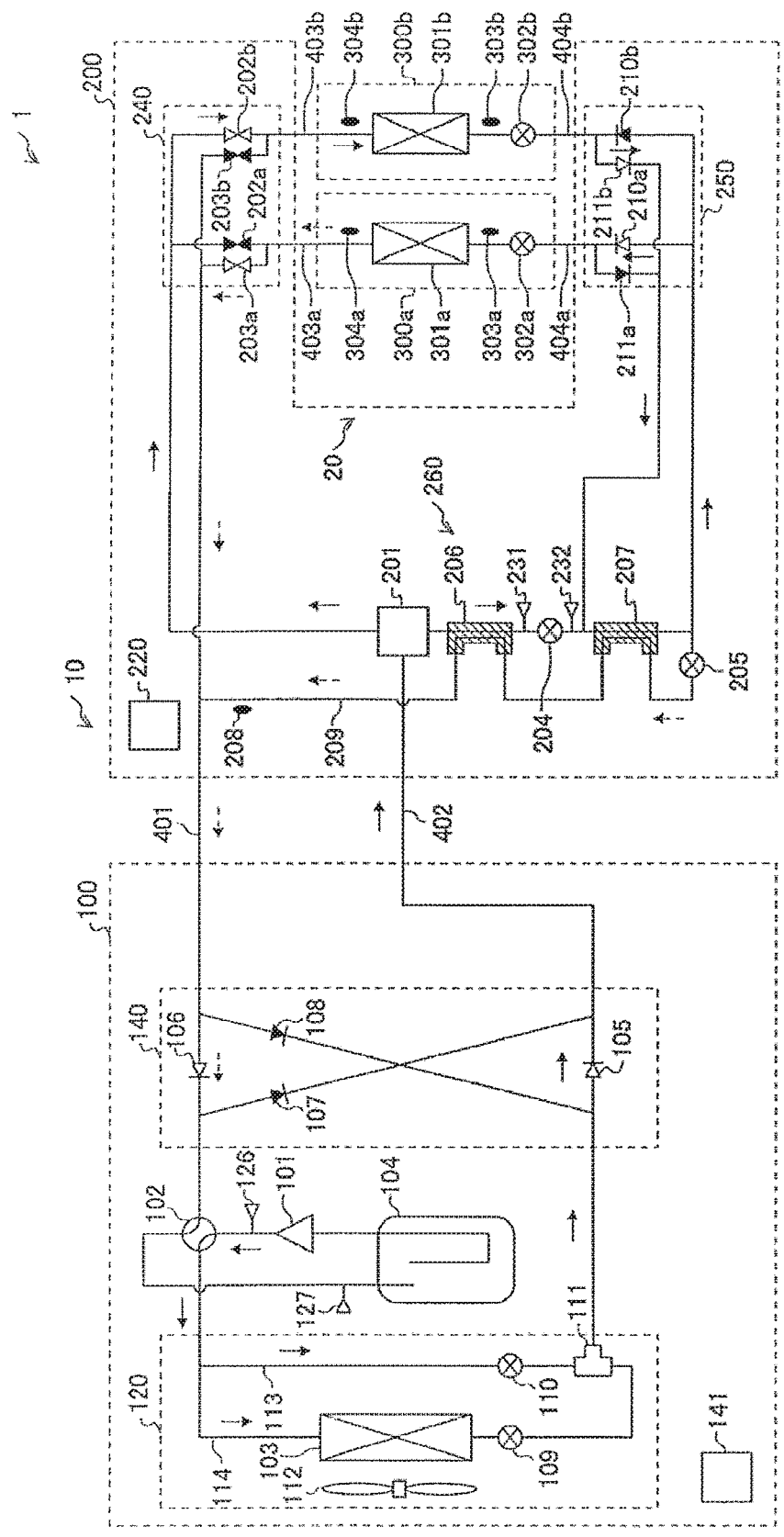
FIG. 9 is a circuit diagram illustrating a state of a cooling main operation of the air-conditioning apparatus 1 according to Embodiment 1 of the present invention.

FIG. 9 is a circuit diagram illustrating a state of a cooling main operation of the air-conditioning apparatus 1 according to Embodiment 1 of the present invention. Next, the cooling main operation will be described. In the air-conditioning apparatus 1, the indoor unit 300a outputs a cooling request and the indoor unit 300b outputs a heating request. As illustrated in FIG. 9, high-temperature and high-pressure gas refrigerant discharged from the compressor 101 passes through the flow switching valve 102 and branches into a refrigerant stream that flows into the main pipe 114 and a refrigerant stream that flows into the bypass pipe 113. The refrigerant stream flowed into the main pipe 114 is subjected to heat exchange, performed by the heat-source-side heat exchanger 103, with outdoor air sent by the heat-source-side fan 112, and is condensed and liquefied. The condensed and liquefied refrigerant stream is then decompressed by the heat-source-side flow control valve 109 and reaches the gas-liquid separating unit 111. On the other hand, the refrigerant stream flowed into the bypass pipe 113 is decompressed by the bypass flow control valve 110 and reaches the gas-liquid separating unit 111. The refrigerant stream flowed into the heat-source-side heat exchanger 103 and the refrigerant stream flowed into the bypass pipe 113 join together in the gas-liquid separating unit 111, and the combined refrigerant passes through the third check valve 105 and the high-pressure pipe 402 and reaches the gas-liquid separator 201. The refrigerant is separated by the gas-liquid separator 201 into refrigerant in a gas state and refrigerant in a liquid state.

The refrigerant in a liquid state flowed out from the liquid outflow side of the gas-liquid separator 201 passes through the first heat exchange unit 206, the liquid-outflow-side flow control valve 204, and the second heat exchange unit 207, and reaches the second branch portion 250. The refrigerant passes through the first check valve 210a of the second branch portion 250 and the liquid branch pipe 404a and flows into the indoor unit 300a. The refrigerant flowed into the indoor unit 300a is decompressed to a low pressure by the load-side flow control valve 302a that is controlled with a superheat amount on the exit side of the load-side heat exchanger 301a. The decompressed refrigerant flows into the load-side heat exchanger 301a, is subjected to heat exchange, performed by the load-side heat exchanger 301a, with indoor air, and is evaporated and gasified. At this time, the inside of the room in which the indoor unit 300a is installed is cooled. Subsequently, the refrigerant in a gas state passes through the gas branch pipe 403a and the cooling solenoid valve 203a of the first branch portion 240 and flows into the low-pressure pipe 401.

On the other hand, the refrigerant in a gas state flowed out from the gas outflow side of the gas-liquid separator 201 passes through the heating solenoid valve 202b of the first branch portion 240, passes through the gas branch pipe 403b, and flows into the indoor unit 300b. The refrigerant flowed into the indoor unit 300b is subjected to heat exchange, performed by the load-side heat exchanger 301b, with indoor air, and is condensed and liquefied. At this time, the inside of the room in which the indoor unit 300b is installed is heated. Subsequently, the condensed and liquefied refrigerant passes through the load-side flow control valve 302b that is controlled with a subcooling amount on the exit side of the load-side heat exchanger 301b and comes into a liquid state at a medium pressure between a high pressure and a low pressure. The refrigerant in a liquid state at the medium pressure passes through the liquid branch pipe 404b and the second check valve 211b of the second branch portion 250 and flows into the second heat exchange unit 207.

Subsequently, the refrigerant flows into the relay bypass pipe 209, is decompressed to a low pressure by the relay bypass flow control valve 205, is subjected to heat exchange, performed by the second heat exchange unit 207, with the refrigerant passed through the liquid-outflow-side flow control valve 204, that is, the refrigerant that is to branch into the relay bypass pipe 209, and is evaporated. Furthermore, the refrigerant is subjected to heat exchange, performed by the first heat exchange unit 206, with the refrigerant that is to flow into the liquid-outflow-side flow control valve 204, and is evaporated. The evaporated refrigerant flows into the low-pressure pipe 401 and joins the refrigerant passed through the cooling solenoid valve 203a. Subsequently, the combined refrigerant passes through the fourth check valve 106, the flow switching valve 102, and the accumulator 104, and is suctioned into the compressor 101.

In the cooling main operation, the heating solenoid valve 202a is closed, whereas the heating solenoid valve 202b is open. The cooling solenoid valve 203a is open, whereas the cooling solenoid valve 203b is closed. As the low-pressure pipe 401 is at a low pressure and the high-pressure pipe 402 is at a high pressure, refrigerant circulates through the third check valve 105 and the fourth check valve 106. Furthermore, as the pressure in the liquid branch pipe 404a is lower than that in the high-pressure pipe 402, no refrigerant flows through the second check valve 211a. Furthermore, as the pressure in the liquid branch pipe 404b is higher than that in the high-pressure pipe 402, no refrigerant flows through the first check valve 210b.

(Heating Main Operation)

Figure 10:
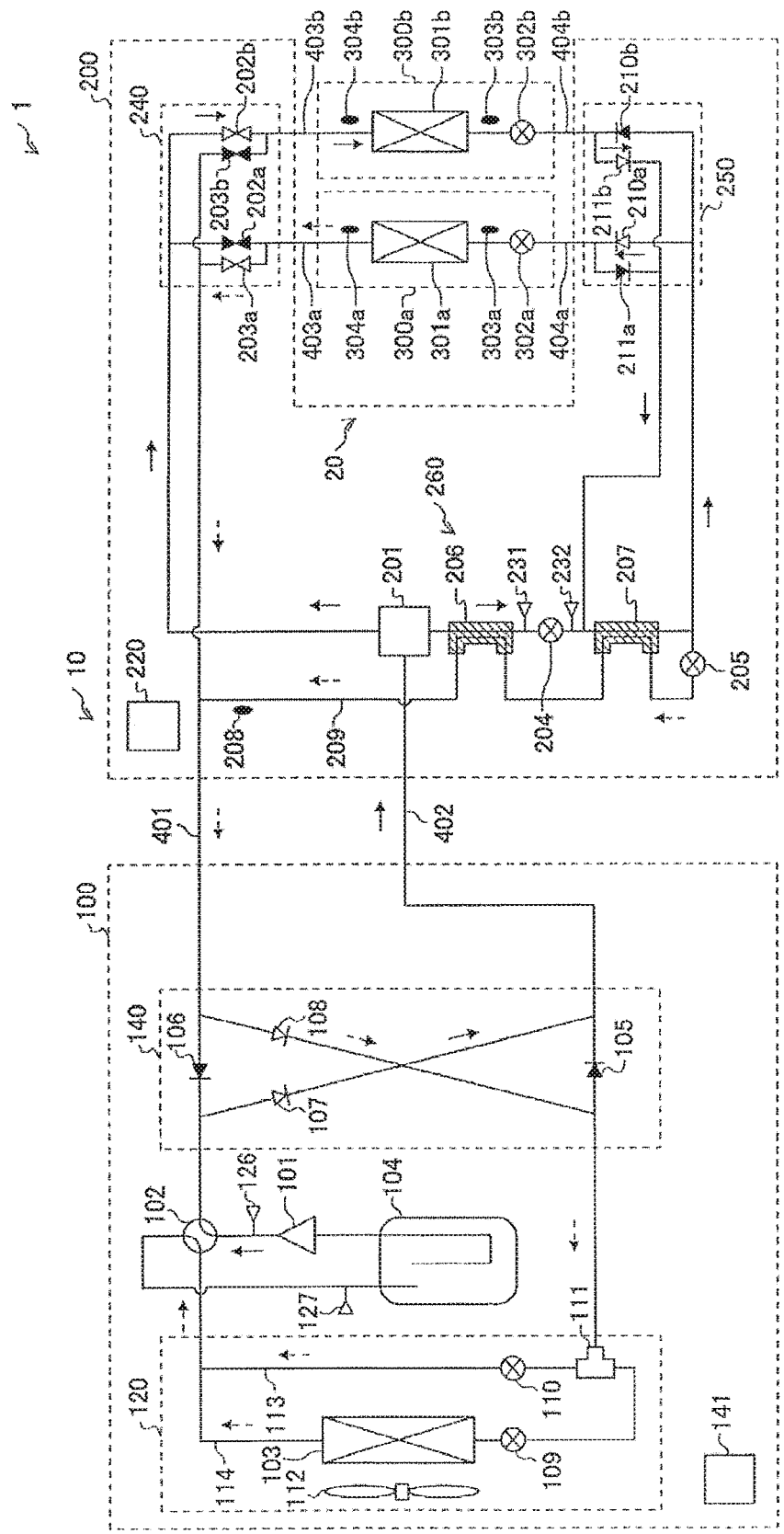
FIG. 10 is a circuit diagram illustrating a state of a heating main operation of the air-conditioning apparatus 1 according to Embodiment 1 of the present invention.

FIG. 10 is a circuit diagram illustrating a state of a heating main operation of the air-conditioning apparatus 1 according to Embodiment 1 of the present invention. Next, the heating main operation will be described. In the air-conditioning apparatus 1, the indoor unit 300b outputs a heating request and the indoor unit 300a outputs a cooling request. As illustrated in FIG. 10, high-temperature and high-pressure gas refrigerant discharged from the compressor 101 passes through the flow switching valve 102, the fifth check valve 107, and the high-pressure pipe 402, and reaches the gas-liquid separator 201. The refrigerant is separated by the gas-liquid separator 201 into refrigerant in a gas state and refrigerant in a liquid state.

The refrigerant in a gas state flowed out from the gas outflow side of the gas-liquid separator 201 passes through the heating solenoid valve 202b of the first branch portion 240 and flows into the indoor unit 300b through the gas branch pipe 403b. The refrigerant flowed into the indoor unit 300b is subjected to heat exchange, performed by the load-side heat exchanger 301b, with indoor air, and is condensed and liquefied. At this time, the inside of the room in which the indoor unit 300b is installed is heated. Subsequently, the condensed and liquefied refrigerant passes through the load-side flow control valve 302b that is controlled with a subcooling amount on the exit side of the load-side heat exchanger 301b and comes into a liquid state at a medium pressure between a high pressure and a low pressure. The refrigerant in a liquid state at the medium pressure passes through the liquid branch pipe 404b and the second check valve 211b of the second branch portion 250 and flows into the second heat exchange unit 207. At this time, the refrigerant joins the refrigerant flowed out from the liquid outflow side of the gas-liquid separator 201 and passed through the first heat exchange unit 206 and the liquid-outflow-side flow control valve 204. The combined refrigerant branches into a refrigerant stream that flows into the second branch portion 250 and a refrigerant stream that flows into the relay bypass pipe 209.

The refrigerant stream flowed into the second branch portion 250 passes through the first check valve 210a of the second branch portion 250 and the liquid branch pipe 404a and flows into the indoor unit 300a. The refrigerant stream flowed into the indoor unit 300a is decompressed to a low pressure by the load-side flow control valve 302a that is controlled with a superheat amount on the exit side of the load-side heat exchanger 301a. The decompressed refrigerant stream flows into the load-side heat exchanger 301a, is subjected to heat exchange, performed by the load-side heat exchanger 301a, with indoor air, and is evaporated and gasified. At this time, the inside of the room in which the indoor unit 300a is installed is cooled. Subsequently, the refrigerant in a gas state passes through the gas branch pipe 403a and the cooling solenoid valve 203a of the first branch portion 240 and flows into the low-pressure pipe 401.

On the other hand, the refrigerant stream flowed into the relay bypass pipe 209 is decompressed to a low pressure by the relay bypass flow control valve 205, is subjected to heat exchange, performed by the second heat exchange unit 207, with the refrigerant passed through the liquid-outflow-side flow control valve 204, that is, the refrigerant that is to branch into the relay bypass pipe 209, and is evaporated. Furthermore, the refrigerant stream is subjected to heat exchange, performed by the first heat exchange unit 206, with the refrigerant that is to flow into the liquid-outflow-side flow control valve 204, and is evaporated. The evaporated refrigerant flows into the low-pressure pipe 401 and joins the refrigerant passed through the cooling solenoid valve 203a. Subsequently, the combined refrigerant passes through the sixth check valve 108 and flows into the gas-liquid separating unit 111. Subsequently, the refrigerant is separated by the gas-liquid separating unit 111 into refrigerant in a gas state and refrigerant in a liquid state.

The refrigerant flowed out from the liquid outflow side of the gas-liquid separating unit 111 to the main pipe 114 is decompressed by the heat-source-side flow control valve 109, is subjected to heat exchange, performed by the heat-source-side heat exchanger 103, with outdoor air sent by the heat-source-side fan 112, and is evaporated and gasified. On the other hand, the refrigerant flowed out from the gas outflow side of the gas-liquid separating unit 111 to the bypass pipe 113 is decompressed by the bypass flow control valve 110 and then joins the refrigerant flowed out of the main pipe 114. The combined refrigerant passes through the flow switching valve 102 and the accumulator 104 and is suctioned into the compressor 101.

In the heating main operation, the heating solenoid valve 202b is open, whereas the heating solenoid valve 202a is closed. The cooling solenoid valve 203a is open, whereas the cooling solenoid valve 203b is closed. As the low-pressure pipe 401 is at a low pressure and the high-pressure pipe 402 is at a high pressure, refrigerant circulates through the fifth check valve 107 and the sixth check valve 108. Furthermore, as the pressure in the liquid branch pipe 404a is lower than that in the high-pressure pipe 402, no refrigerant flows through the second check valve 211a. Furthermore, as the pressure in the liquid branch pipe 404b is higher than that in the high-pressure pipe 402, no refrigerant flows through the first check valve 210b.

Figure 11:
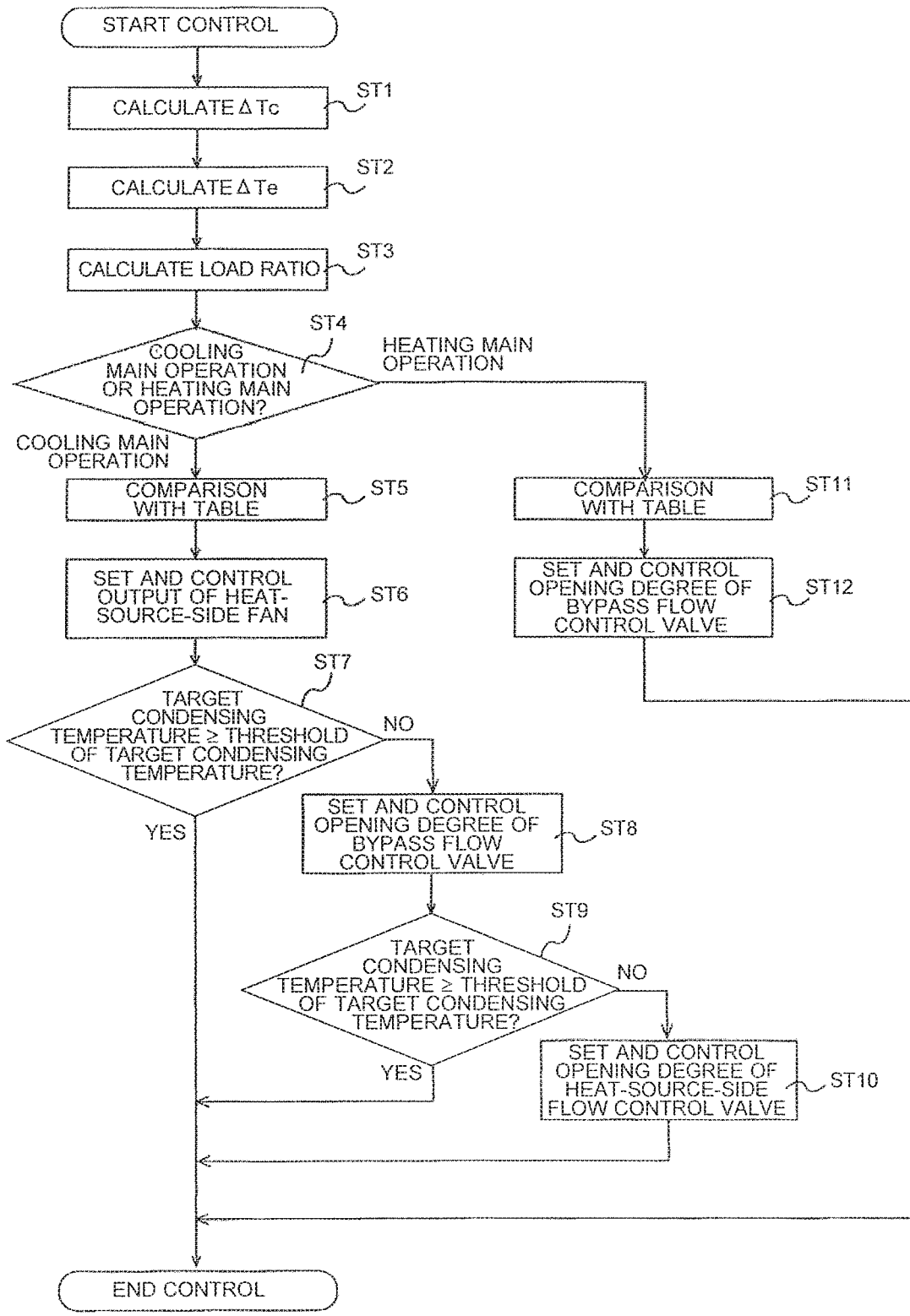
FIG. 11 is a flowchart illustrating an operation of the air-conditioning apparatus 1 according to Embodiment 1 of the present invention.

FIG. 11 is a flowchart illustrating an operation of the air-conditioning apparatus 1 according to Embodiment 1 of the present invention. Next, an operation of the control unit 10 will be described. As illustrated in FIG. 11, $\Delta Tc$ is calculated by subtracting a target condensing temperature Tcm from a current condensing temperature Tc (step ST1). Subsequently, $\Delta Te$ is calculated by subtracting a target evaporating temperature Tem from a current evaporating temperature Te (step ST2). Subsequently, a load ratio of a cooling load capacity to a heating load capacity is calculated on the basis of $\Delta Tc$, $\Delta Te$, a total cooling capacity $\Sigma Qjc$, and a total heating capacity $\Sigma Qjh$ (step ST3), and the operation modes are switched. Subsequently, the setting unit 12 determines which of a cooling main operation and a heating main operation is being performed (step ST4).

If it is determined in step ST4 that a cooling main operation is being performed, the setting unit 12 compares the calculated load ratio with that listed in the airflow table stored in the storage unit 11 (step ST5). Subsequently, the setting unit 12 sets an output of the heat-source-side fan 112, and the device control unit 13 controls the output of the heat-source-side fan 112 (step ST6). Here, the setting unit 12 determines whether or not the target condensing temperature of the heat-source-side heat exchanger 103 is higher than or equal to a threshold of the target condensing temperature (step ST7). If the target condensing temperature is higher than or equal to the threshold of the target condensing temperature (YES in step ST7), the control ends.

On the other hand, if the target condensing temperature is lower than the threshold of the target condensing temperature (NO in step ST7), the setting unit 12 sets an opening degree of the bypass flow control valve 110, and the device control unit 13 controls the opening degree of the bypass flow control valve 110 (step ST8). Here, the setting unit 12 determines whether or not the target condensing temperature of the heat-source-side heat exchanger 103 is higher than or equal to the threshold of the target condensing temperature (step ST9). If the target condensing temperature is higher than or equal to the threshold of the target condensing temperature (YES in step ST9), the control ends. On the other hand, if the target condensing temperature is lower than the threshold of the target condensing temperature (NO in step ST9), the setting unit 12 sets an opening degree of the heat-source-side flow control valve 109, and the device control unit 13 controls the opening degree of the heat-source-side flow control valve 109 (step ST10). Subsequently, the control ends.

If it is determined in step ST4 that a heating main operation is being performed, the setting unit 12 compares the calculated load ratio with that listed in the opening degree table stored in the storage unit 11 (step ST11). Subsequently, the setting unit 12 sets an opening degree of the bypass flow control valve 110, and the device control unit 13 controls the opening degree of the bypass flow control valve 110 (step ST12). Subsequently, the control ends.

According to Embodiment 1, when refrigerant flows out to the high-pressure pipe 402, the gas-liquid separating unit 111 mixes refrigerant in a liquid state flowing through the heat-source-side heat exchanger 103 and refrigerant in a gas state flowing through the bypass pipe 113 and causes the mixed refrigerant to flow out to the high-pressure pipe 402. When refrigerant flows in from the low-pressure pipe 401, the gas-liquid separating unit 111 separates the refrigerant flowing in from the low-pressure pipe 401 into refrigerant in a liquid state flowing into the heat-source-side heat exchanger 103 and refrigerant in a gas state flowing into the bypass pipe 113. Consequently, to control the heat exchange ability of the heat-source-side heat exchanger 103, the opening degree of the bypass flow control valve 110 may be controlled in any operation mode.

Hitherto, in the air-conditioning apparatus 1 that performs a simultaneous cooling and heating operation, a heat recovery operation is performed in which heat in the room to be cooled is used for heating. If the load of a cooling operation and the load of a heating operation are equivalent to each other and if a complete heat recovery operation is performed, it is necessary to reduce an amount of heat exchange in a heat-source-side heat exchanger. That is, to increase comfort and energy saving performance of the air-conditioning apparatus in a heat recovery operation, it is necessary to make a heat radiation amount of the heat-source-side heat exchanger close to zero in the case of a cooling main operation, and it is necessary to make a heat absorption amount of the heat-source-side heat exchanger close to zero in the case of a heating main operation.

In this case, it is necessary to set the compression ratio of a compressor to a predetermined value, for example, 2 or more, from the viewpoint of the reliability of the compressor. Thus, in a cooling operation, it is necessary to decrease AK in an operation at a low outdoor temperature or low compression operation capacity. Here, in an air-cooled heat-source-side heat exchanger, it is necessary to ensure a predetermined output or more of a heat-source-side fan and to cool an electric board or other related component provided in a heat source unit. In a water-cooled heat-source-side heat exchanger, it is necessary to ensure a predetermined water flow rate or more and to reduce pitting corrosion of a pipe through which water flows. Consequently, it is impossible to decrease AK to a desired value, and a low-pressure side pressure decreases in a refrigerant circuit.

In an indoor unit that is performing a cooling operation, it is necessary to keep the evaporating temperature of a load-side heat exchanger at 0 degrees C. or higher to prevent freezing of water in the air in the load-side heat exchanger. However, if the low-pressure side pressure decreases in the refrigerant circuit and if it becomes impossible to keep the evaporating temperature of the load-side heat exchanger at 0 degrees C. or higher, the operation of the indoor unit needs to be stopped. Thus, activation and deactivation of the operation, that is, start and stop, occurs frequently in the indoor unit, comfort in the room is not ensured, and the energy saving performance degrades.

Consequently, there has been proposed a technique of controlling the fourth flow control device and the switching valve in a cooling main operation, controlling the fifth flow control device in a heating main operation, and controlling the heat exchange ability of the heat-source-side heat exchanger when the cooling-heating capacity in a simultaneous cooling and heating operation changes. However, in this related art, different flow control valves are necessary for individual operation modes to control the heat exchange ability of the heat-source-side heat exchanger. Thus, the number of components increases and the cost increases accordingly.

On the other hand, in Embodiment 1, the heat exchange ability of the heat-source-side heat exchanger 103 can be controlled by controlling the opening degree of the common bypass flow control valve 110 in any operation mode. Furthermore, three valves, that is, the fourth flow control valve, the fifth flow control valve, and the switching valve, are used in the related art, whereas only two valves, that is, the heat-source-side flow control valve 109 and the bypass flow control valve 110, are necessary in Embodiment 1. Thus, the number of components can be reduced and the cost can be reduced accordingly. In addition, the pipes that are connected are simplified. Thus, service quality can be increased and space saving can be achieved by reducing the size of the apparatus.

The air-conditioning apparatus 1 further includes the load capacity measuring unit 20 that measures the cooling-heating load capacities of the plurality of indoor units 300a and 300b and the control unit 10 that controls the operation of the heat source unit 100. The control unit 10 includes the storage unit 11 that stores an opening degree table in which the cooling-heating load capacities of the plurality of indoor units 300a and 300b are associated with an opening degree control value of the bypass flow control valve 110, the setting unit 12 that compares the cooling-heating capacities of the plurality of indoor units 300a and 300b measured by the load capacity measuring unit 20 with those listed in the opening degree table stored in the storage unit 11 and sets an opening degree of the bypass flow control valve 110, and the device control unit 13 that controls an opening degree of the bypass flow control valve 110 to the opening degree of the bypass flow control valve 110 set by the setting unit 12. Also, in the opening degree table, the cooling-heating load capacities of the plurality of indoor units 300a and 300b are associated with an opening degree control value of the heat-source-side flow control valve 109. The setting unit 12 is configured to compare the cooling-heating capacities of the plurality of indoor units 300a and 300b measured by the load capacity measuring unit 20 with those listed in the opening degree table stored in the storage unit 11 and set an opening degree of the heat-source-side flow control valve 109. The device control unit 13 is configured to control an opening degree of the heat-source-side flow control valve 109 to the opening degree of the heat-source-side flow control valve 109 set by the setting unit 12. In addition, in the opening degree table, a load ratio of a cooling load capacity to a heating load capacity of the plurality of indoor units 300a and 300b is associated with a target temperature of the heat-source-side heat exchanger 103, and the target temperature is associated with the opening degree control value of the bypass flow control valve 110 and the opening degree control value of the heat-source-side flow control valve 109.

The air-conditioning apparatus 1 further includes the load capacity measuring unit 20 that measures the cooling-heating load capacities of the plurality of indoor units 300a and 300b and the control unit 10 that controls the operation of the heat source unit 100. The heat source unit 100 further includes the heat-source-side fan 112 that sends outdoor air to the heat-source-side heat exchanger 103. The control unit 10 includes the storage unit 11 that stores an airflow table in which the cooling-heating load capacities of the plurality of indoor units 300a and 300b are associated with an output control value of the heat-source-side fan 112, the setting unit 12 that compares the cooling-heating capacities of the plurality of indoor units 300a and 300b measured by the load capacity measuring unit 20 with those listed in the airflow table stored in the storage unit 11 and sets an output of the heat-source-side fan 112, and the device control unit 13 that controls an output of the heat-source-side fan 112 to the output of the heat-source-side fan 112 set by the setting unit 12. In the airflow table, a load ratio of a cooling load capacity to a heating load capacity of the plurality of indoor units 300a and 300b is associated with a target temperature of the heat-source-side heat exchanger 103, and the target temperature is associated with the opening degree control value of the heat-source-side flow control valve 109 or the output control value of the seat-source-side fan 112.

Here, if the capacity of a heating operation increases in a cooling main operation, it is necessary to increase the quality of refrigerant flowing into a relay unit. When the heat exchange capacity of a heat-source-side heat exchanger is constant, the condensing temperature, that is, the pressure on a high-pressure side, of the heat-source-side heat exchanger decreases. This pressure decrease causes a decrease in temperature of refrigerant flowing through a liquid pipe measured by a liquid pipe temperature measuring unit of an indoor unit that is performing a cooling operation. Thus, the indoor unit repeats start and stop, that is, thermo-on and thermo-off. Consequently, the cooling operation is intermittently performed, the heating ability decreases due to the low condensing temperature, and discomfort of a user may increase. In addition, it is necessary to maintain a liquid pipe temperature to prevent start and stop of the indoor unit, but the liquid pipe temperature varies between indoor units. Thus, it is necessary to individually control liquid pipe temperatures in the individual indoor units to increase the liquid pipe temperature, and thus the complexity of control is likely to increase.

On the other hand, in Embodiment 1, the heat exchange ability of the heat-source-side heat exchanger 103 is controlled depending on a cooling-heating load capacity and thus control can be simplified. Furthermore, the repetition of start and stop of the indoor units 300a and 300b is reduced, thus contributing to energy saving.

Embodiment 2

Figure 12:
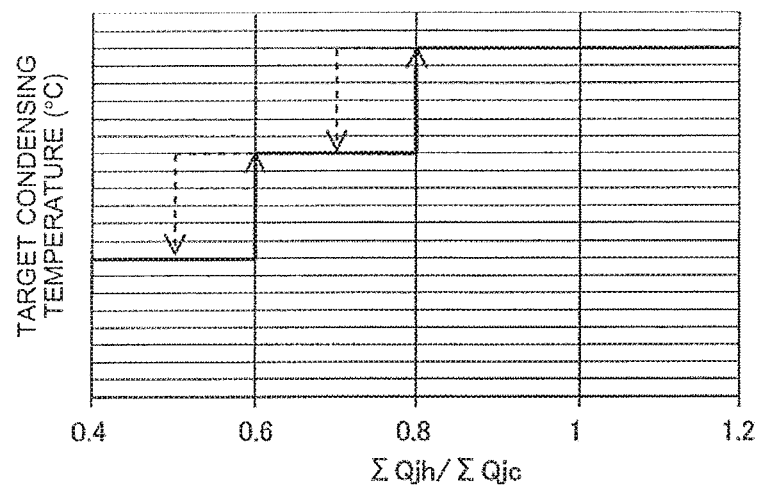
FIG. 12 is a graph illustrating a relationship between a heating-cooling capacity ratio and a target condensing temperature in Embodiment 2 of the present invention.

FIG. 12 is a graph illustrating a relationship between a heating-cooling capacity ratio and a target condensing temperature according to Embodiment 2 of the present invention. Embodiment 2 is different from Embodiment 1 in the table stored in the storage unit 11. In Embodiment 2, the same parts as those in Embodiment 1 are denoted by the same reference numerals and the description of the same parts will not be given. A description will be given mainly of a difference from Embodiment 1.

In FIG. 12, the horizontal axis represents a heating-cooling capacity ratio ΣQjh/ΣQjc that is calculated by dividing a total heat amount for heating ΣQjh by a total heat amount for cooling ΣQjc, and the vertical axis represents a target condensing temperature (degrees C.) of the heat-source-side heat exchanger 103. As illustrated in FIG. 12, a target temperature is associated with a load ratio in the table so that the target temperature changes stepwise depending on the load ratio in a cooling main operation. Also, hysteresis is provided so that a target condensing temperature varies between a case where the heating-cooling capacity ratio is large and a case where the heating-cooling capacity ratio is small.

According to Embodiment 2, in the opening degree table or the airflow table, a target temperature is associated with a load ratio such that the target temperature changes stepwise depending on the load ratio. Thus, more stable control can be performed than in a case where the target temperature changes linearly depending on the load ratio. In addition, as hysteresis is provided so that a target condensing temperature varies between a case where the heating-cooling capacity ratio is large and a case where the heating-cooling capacity ratio is small. Thus, the association between a load ratio and a target condensing temperature is uniformed.

If the target condensing temperature is variable and if the indoor units 300a and 300b are frequently starts and stops, the operation is likely to be unstable. Thus, the number of increases or decreases of the opening degree of the bypass flow control valve 110 and the number of increases or decreases of the rotation speed of the heat-source-side fan 112 may be decreased to perform control in a larger period, and thereby the operation may be stabled. In addition, the operation may be further stabled by making the target condensing temperature always constant.

REFERENCE SIGNS LIST 1 air-conditioning apparatus 10 control unit 11 storage unit 12 setting unit 13 device control unit 20 load capacity measuring unit 100 heat source unit 101 compressor 102 flow switching valve 103 heat-source-side heat exchanger 104 accumulator 105 third check valve 106 fourth check valve 107 fifth check valve 108 sixth check valve 109 heat-source-side flow control valve 110 bypass flow control valve 111 gas-liquid separating unit 112 heat-source-side fan 113 bypass pipe 114 main pipe 120 heat-source-side heat exchange unit 126 discharge pressure measuring unit 127 suction pressure measuring unit 140 heat-source-side flow direction control unit 141 controller 200 relay unit 201 gas-liquid separator 202a, 202b heating solenoid valve 203a, 203b cooling solenoid valve 204 liquid-outflow-side flow control valve 205 relay bypass flow control valve 206 first heat exchange unit 207 second heat exchange unit 208 relay bypass temperature measuring unit 209 relay bypass pipe 210a, 210b first check valve 211a, 211b second check valve 220 controller 231 liquid outflow pressure measuring unit 231 downstream-side liquid outflow pressure measuring unit 240 first branch portion 250 second branch portion 260 heat exchange unit 300a, 300b indoor unit 301a, 301b load-side heat exchanger 302a, 302b load-side flow control valve 303a, 303b liquid pipe temperature measuring unit 304a, 304b gas pipe temperature measuring unit 401 low-pressure pipe 402 high-pressure pipe 403a, 403b gas branch pipe 404a, 404b liquid branch pipe

The invention claimed is:
1. An air-conditioning apparatus, comprising:
a heat source unit including a compressor, a flow switching valve, and a heat-source-side heat exchanger;
a plurality of indoor units, each including a load-side flow control valve and a load-side heat exchanger and performing a cooling operation or a heating operation;
a relay unit connected to the heat source unit by a low-pressure pipe and a high-pressure pipe, connected to the plurality of indoor units by a plurality of gas branch pipes and a plurality of liquid branch pipes, and configured to distribute refrigerant supplied from the heat source unit to the plurality of indoor units;
a load capacity measuring unit including liquid pipe temperature sensors and gas pipe temperature sensors and configured to measure cooling-heating load capaci- ties of the plurality of indoor units by the liquid pipe temperature sensors and the gas pipe temperature sensors; and
a controller configured to control an operation of the heat source unit, wherein
the heat source unit includes
a heat-source-side flow control valve connected to the heat-source-side heat exchanger in series and configured to control a flow rate of refrigerant flowing through the heat-source-side heat exchanger,
a bypass pipe connected in parallel to the heat-source-side heat exchanger and the heat-source-side flow control valve,
a bypass flow control valve provided in the bypass pipe and configured to control a flow rate of refrigerant flowing through the bypass pipe, and
a gas-liquid separating unit connected to the heat-source-side heat exchanger, the bypass pipe, the high-pressure pipe, and the low-pressure pipe, configured to, when refrigerant flows out to the high-pressure pipe, mix refrigerant in a liquid state flowing through the heat-source-side heat exchanger and refrigerant in a gas state flowing through the bypass pipe and cause mixed refrigerant to flow out to the high-pressure pipe, and configured to, when refrigerant flows in from the low-pressure pipe, separate the refrigerant flowing in from the low-pressure pipe into refrigerant in a liquid state flowing into the heat-source-side heat exchanger and refrigerant in a gas state flowing into the bypass pipe, and
the controller is configured to
store an opening degree table in which the cooling-heating load capacities of the plurality of indoor units are associated with an opening degree control value of the bypass flow control valve,
compare the cooling-heating load capacities of the plurality of indoor units measured by the load capacity measuring unit with the cooling-heating load capacities of the plurality of indoor units listed in the stored opening degree table and set an opening degree of the bypass flow control valve, and
control an opening degree of the bypass flow control valve to the set opening degree of the bypass flow control valve.

2. The air-conditioning apparatus of claim 1, wherein
in the opening degree table, the cooling-heating load capacities of the plurality of indoor units are associated with an opening degree control value of the heat-source-side flow control valve,
the controller is configured to compare the cooling-heating load capacities of the plurality of indoor units measured by the load capacity measuring unit with the cooling-heating load capacities of the plurality of indoor units listed in the stored opening degree table and set an opening degree of the heat-source-side flow control valve, and
control an opening degree of the heat-source-side flow control valve to the set opening degree of the heat-source-side flow control valve.

3. The air-conditioning apparatus of claim 1, wherein, in the opening degree table, a load ratio of a cooling load capacity to a heating load capacity of the plurality of indoor units is associated with a target temperature of the heat-source-side heat exchanger, and the target temperature is associated with the opening degree control value of the bypass flow control valve or an opening degree control value of the heat-source-side flow control valve.

4. An air-conditioning apparatus comprising:
a heat source unit including a compressor, a flow switching valve, and a heat-source-side heat exchanger;
a plurality of indoor units, each including a load-side flow control valve and a load-side heat exchanger and performing a cooling operation or a heating operation;
a relay unit connected to the heat source unit by a low-pressure pipe and a high-pressure pipe, connected to the plurality of indoor units by a plurality of gas branch pipes and a plurality of liquid branch pipes, and configured to distribute refrigerant supplied from the heat source unit to the plurality of indoor units;
a load capacity measuring unit including liquid pipe temperature sensors and gas pipe temperature sensors, and configured to measure cooling-heating load capacities of the plurality of indoor units by the liquid pipe temperature sensors and the gas pipe temperature sensors; and
a controller configured to control an operation of the heat source unit, wherein
the heat source unit includes
a heat-source-side flow control valve connected to the heat-source-side heat exchanger in series and configured to control a flow rate of refrigerant flowing through the heat-source-side heat exchanger,
a bypass pipe connected in parallel to the heat-source-side heat exchanger and the heat-source-side flow control valve,
a bypass flow control valve provided in the bypass pipe and configured to control a flow rate of refrigerant flowing through the bypass pipe,
a gas-liquid separating unit connected to the heat-source-side heat exchanger, the bypass pipe, the high-pressure pipe, and the low-pressure pipe, configured to, when refrigerant flows out to the high-pressure pipe, mix refrigerant in a liquid state flowing through the heat-source-side heat exchanger and refrigerant in a gas state flowing through the bypass pipe and cause mixed refrigerant to flow out to the high-pressure pipe, and configured to, when refrigerant flows in from the low-pressure pipe, separate the refrigerant flowing in from the low-pressure pipe into refrigerant in a liquid state flowing into the heat-source-side heat exchanger and refrigerant in a gas state flowing into the bypass pipe, and
a heat-source-side fan configured to send outdoor air to the heat-source-side heat exchanger, and
the controller is configured to
store an airflow table in which the cooling-heating load capacities of the plurality of indoor units are associated with an output control value of the heat-source-side fan,
compare the cooling-heating load capacities of the plurality of indoor units measured by the load capacity measuring unit with the cooling-heating load capacities of the plurality of indoor units listed in the stored airflow table and set an output of the heat-source-side fan, and
control an output of the heat-source-side fan to the set output of the heat-source-side fan.

5. The air-conditioning apparatus of claim 4, wherein, in the airflow table, a load ratio of a cooling load capacity to a heating load capacity of the plurality of indoor units is associated with a target temperature of the heat-source-side heat exchanger, and the target temperature is associated with the output control value of the heat-source-side fan.

6. The air-conditioning apparatus of claim 5, wherein, in the airflow table, the target temperature is associated with the load ratio such that the target temperature changes stepwise depending on the load ratio.

7. An air-conditioning apparatus, comprising:
a heat source unit including a compressor, a flow switching valve, and a heat-source-side heat exchanger;
a plurality of indoor units, each including a load-side flow control valve and a load-side heat exchanger and performing a cooling operation or a heating operation;
a relay unit connected to the heat source unit by a low-pressure pipe and a high-pressure pipe, connected to the plurality of indoor units by a plurality of gas branch pipes and a plurality of liquid branch pipes, and configured to distribute refrigerant supplied from the heat source unit to the plurality of indoor units; and
a controller configured to control an operation of the heat source unit, wherein
the heat source unit includes
a heat-source-side flow control valve connected to the heat-source-side heat exchanger in series and configured to control a flow rate of refrigerant flowing through the heat-source-side heat exchanger,
a bypass pipe connected in parallel to the heat-source-side heat exchanger and the heat-source-side flow control valve,
a bypass flow control valve provided in the bypass pipe and configured to control a flow rate of refrigerant flowing through the bypass pipe,
a gas-liquid separating unit connected to the heat-source-side heat exchanger, the bypass pipe, the high-pressure pipe, and the low-pressure pipe, configured to, when refrigerant flows out to the high-pressure pipe, mix refrigerant in a liquid state flowing through the heat-source-side heat exchanger and refrigerant in a gas state flowing through the bypass pipe and cause mixed refrigerant to flow out to the high-pressure pipe, and configured to, when refrigerant flows in from the low-pressure pipe, separate the refrigerant flowing in from the low-pressure pipe into refrigerant in a liquid state flowing into the heat-source-side heat exchanger and refrigerant in a gas state flowing into the bypass pipe, and
a heat-source-side fan configured to send outdoor air to the heat-source-side heat exchanger, and
the controller is configured to decrease an output of the heat-source-side fan to decrease a heat exchange capacity of the heat-source-side heat exchanger, and then control an opening degree of the bypass flow control valve and an opening degree of the heat-source-side flow control valve to decrease the heat exchange capacity of the heat-source-side heat exchanger.

8. The air-conditioning apparatus of claim 7, wherein the controller is configured to, while the heat source unit is operating, operate the heat-source-side fan at an output larger than or equal to an output minimum value at which the heat-source-side fan does not stop operating.

9. The air-conditioning apparatus of claim 8, wherein the controller is configured to, when the output of the heat-source-side fan is larger than the output minimum value, fully close the bypass flow control valve, and, when the output of the heat-source-side fan is equal to the output minimum value, gradually open the bypass flow control valve to decrease the heat exchange capacity of the heat-source-side heat exchanger.

10. The air-conditioning apparatus of claim 9, wherein the controller is configured to gradually open the bypass flow control valve to decrease the heat exchange capacity of the heat-source-side heat exchanger, and then gradually close the heat-source-side flow control valve to decrease the heat exchange capacity of the heat-source-side heat exchanger.

11. The air-conditioning apparatus of claim 3, wherein, in the opening degree table, the target temperature is associated with the load ratio such that the target temperature changes stepwise depending on the load ratio.

* * * * *